(12) United States Patent
McCullough et al.

(10) Patent No.: US 12,454,864 B2
(45) Date of Patent: **\*Oct. 28, 2025**

(54) CLUTCH ASSEMBLY AND RELATED SYSTEMS AND METHODS

(71) Applicant: NTS AMEGA WEST USA, INC, Houston, TX (US)

(72) Inventors: Robert McCullough, Parkland County (CA); Adam Well, Spring, TX (US); Everett Hagar, Devon (CA); Sean O'Neill, Tomball, TX (US); Harris Hurst, The Woodlands, TX (US)

(73) Assignee: NTS AMEGA WEST USA, INC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/913,490

(22) Filed: Oct. 11, 2024

(65) Prior Publication Data

US 2025/0034944 A1 Jan. 30, 2025

Related U.S. Application Data

(63) Continuation of application No. 17/977,678, filed on Oct. 31, 2022, now Pat. No. 12,152,467.

(Continued)

(51) Int. Cl.
*E21B 4/00* (2006.01)
*E21B 4/02* (2006.01)
(Continued)

(52) U.S. Cl.
CPC ............... *E21B 4/006* (2013.01); *E21B 4/02* (2013.01); *F16D 1/10* (2013.01); *F16D 11/10* (2013.01); *F16D 2001/103* (2013.01)

(58) Field of Classification Search
CPC ... E21B 4/006; E21B 4/02; E21B 4/10; F16D 11/10; F16D 2001/103; F16D 1/10
See application file for complete search history.

(56) References Cited

U.S. PATENT DOCUMENTS

| 4,299,296 A | 11/1981 | Geczy |
| 4,971,158 A | 11/1990 | Salmi |

(Continued)

FOREIGN PATENT DOCUMENTS

| CA | 2561036 A1 | 10/2005 |
| CA | 2568053 A1 | 5/2007 |

(Continued)

OTHER PUBLICATIONS

"CasingSwivel"—Rubicon Oilfield International. (n.d.). May 8, 2018-Nov. 7, 2021. Retrieved Oct. 27, 2022. Rubicon Oilfield International. https://web.archive.org/web/20181220165500/http://www.rubicon-oilfield.com:80/products/casingswivel/.

(Continued)

*Primary Examiner* — Tara Schimpf
*Assistant Examiner* — Lamia Quaim
(74) *Attorney, Agent, or Firm* — ALG Intellectual Property, LLC

(57) ABSTRACT

Clutch assemblies and related systems are provided. In some embodiments, the system comprises the clutch assembly, a circulation assembly, and an actuation mechanism operatively connected to the clutch assembly and the circulation assembly. In some embodiments, the clutch assembly allows for selective rotation of a bottom hole assembly of a drill string and the circulation assembly allows for selective exhausting of drilling fluid from the drill string. Related drill strings and methods for drilling a borehole are also provided.

19 Claims, 14 Drawing Sheets

Related U.S. Application Data

(60) Provisional application No. 63/321,166, filed on Mar. 18, 2022.

(51) Int. Cl.
*F16D 1/10* (2006.01)
*F16D 11/10* (2006.01)

(56) References Cited

U.S. PATENT DOCUMENTS

| | | | |
|---|---|---|---|
| 5,181,576 A | 1/1993 | Askew et al. | |
| 5,421,421 A | 6/1995 | Appleton | |
| 5,738,178 A | 4/1998 | Williams et al. | |
| 6,082,457 A * | 7/2000 | Best | E21B 17/05 166/301 |
| 6,158,533 A | 12/2000 | Gillis et al. | |
| 6,227,313 B1 | 5/2001 | Davis et al. | |
| 6,328,119 B1 | 12/2001 | Gillis et al. | |
| 6,439,321 B1 | 8/2002 | Gillis et al. | |
| 6,446,737 B1 | 9/2002 | Fontana et al. | |
| 6,571,888 B2 | 6/2003 | Comeau et al. | |
| 6,679,341 B2 | 1/2004 | Bloom et al. | |
| 6,918,452 B2 | 7/2005 | Chan et al. | |
| 7,178,611 B2 | 2/2007 | Zupanick | |
| 7,467,658 B2 | 12/2008 | Kent et al. | |
| 7,467,672 B2 | 12/2008 | Cruickshank | |
| 7,481,282 B2 | 1/2009 | Horst et al. | |
| 7,607,495 B2 | 10/2009 | Bloom et al. | |
| 7,673,708 B2 | 3/2010 | Lee | |
| 7,681,650 B2 | 3/2010 | Telfer et al. | |
| 7,987,927 B2 | 8/2011 | Downton | |
| RE42,877 E | 11/2011 | Lirette et al. | |
| 8,307,921 B2 | 11/2012 | Eddison | |
| 8,448,722 B2 | 5/2013 | Konschuh et al. | |
| 8,776,915 B2 | 7/2014 | Beylotte et al. | |
| 8,789,579 B2 | 7/2014 | Ollerenshaw et al. | |
| 8,869,916 B2 | 10/2014 | Clausen et al. | |
| 9,016,400 B2 | 4/2015 | Clausen et al. | |
| 9,187,955 B2 | 11/2015 | Beylotte et al. | |
| 9,376,865 B2 | 6/2016 | Kirkhope et al. | |
| 9,637,977 B2 | 5/2017 | Giroux et al. | |
| 9,797,204 B2 | 10/2017 | Kirkhope | |
| 10,047,573 B2 | 8/2018 | Kadam et al. | |
| 10,066,438 B2 | 9/2018 | Kirkhope et al. | |
| 10,273,753 B2 | 4/2019 | Marland et al. | |
| 10,280,700 B2 | 5/2019 | Moyes | |
| 10,358,903 B2 | 7/2019 | Smith | |
| 10,597,943 B2 | 3/2020 | Wheeler et al. | |
| 10,648,265 B2 | 5/2020 | Kinsella et al. | |
| 10,883,316 B2 | 1/2021 | Samuel et al. | |
| 10,968,722 B2 | 4/2021 | Buckland et al. | |
| 11,136,842 B2 | 10/2021 | Beach et al. | |
| 11,525,318 B2 | 12/2022 | Shen et al. | |
| 11,686,156 B2 | 6/2023 | Munguia et al. | |
| 11,802,462 B2 | 10/2023 | Churchill | |
| 11,867,013 B2 | 1/2024 | Caminari | |
| 12,000,228 B2 | 6/2024 | Stokes et al. | |
| 2007/0012440 A1 | 1/2007 | Lee | |
| 2008/0236481 A1 | 10/2008 | Petersen et al. | |
| 2011/0214963 A1 | 9/2011 | Beylotte et al. | |
| 2011/0284292 A1 | 11/2011 | Gibb et al. | |
| 2013/0248203 A1 | 9/2013 | Scott et al. | |
| 2014/0231144 A1 | 8/2014 | Sonar et al. | |
| 2014/0284110 A1 | 9/2014 | Savage et al. | |
| 2018/0163509 A1 | 6/2018 | Churchill | |
| 2020/0263507 A1 | 8/2020 | Crowther et al. | |
| 2023/0295988 A1 | 9/2023 | McCullough et al. | |

FOREIGN PATENT DOCUMENTS

| | | |
|---|---|---|
| CA | 2494237 C | 3/2008 |
| CA | 3009888 A1 | 7/2017 |
| CA | 2995267 A1 | 9/2018 |
| EP | 1398455 B1 | 3/2004 |
| EP | 2923025 A1 | 9/2015 |
| EP | 3397832 A1 | 11/2018 |
| WO | 2011109075 A2 | 9/2011 |
| WO | 2019100116 A1 | 5/2019 |
| WO | 2021151189 A1 | 8/2021 |

OTHER PUBLICATIONS

Arrival Technology Forum Featuring Mud Motors, "Rotary Bottom Hole Assemblies," Nov. 1, 2018. International Association of Directional Drilling.

Halliburton Sperry Drilling. (n.d.). "Operator Drills Gulf of Thailand's Longest Openhole Production Section in One Run". 2018. In Quasar Trio (Case Study No. HAL123807). https://cdn.brandfolder.io/VUJJLY3X/at/3jgvkz8p2stjvp5rxgwznx/Thailand_QuasarTrio_HT_H012985_CS.pdf.

Ryan, J., et al. Nov. 13, 2017. "Casing Swivel Tool Greatly Expands Liner Deployment Capability in the Giant Offshore Oil Field Abu Dhabi Resulting in a World Record Single-Run 6-5/8 Inch Lower Completion". https://doi.org/10.2118/188783-ms.

* cited by examiner

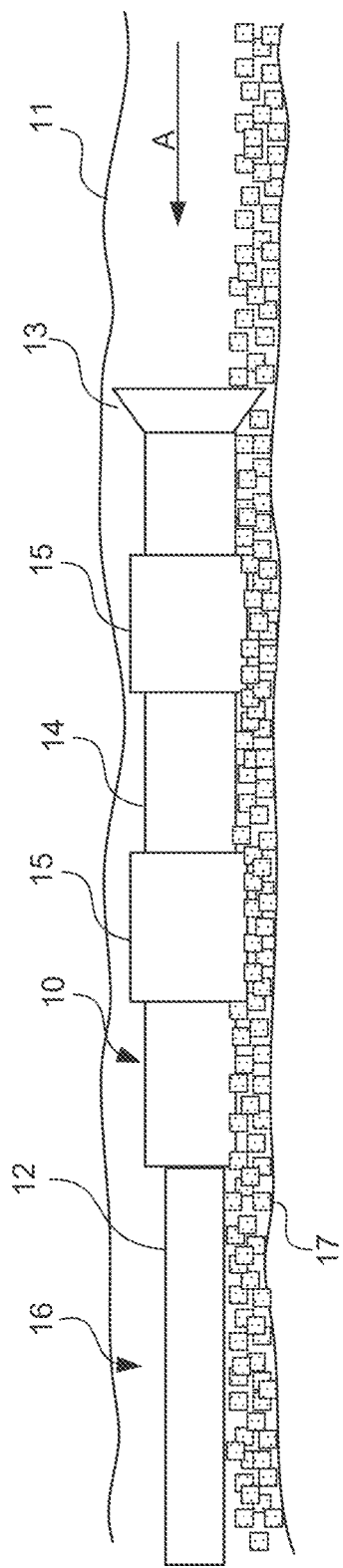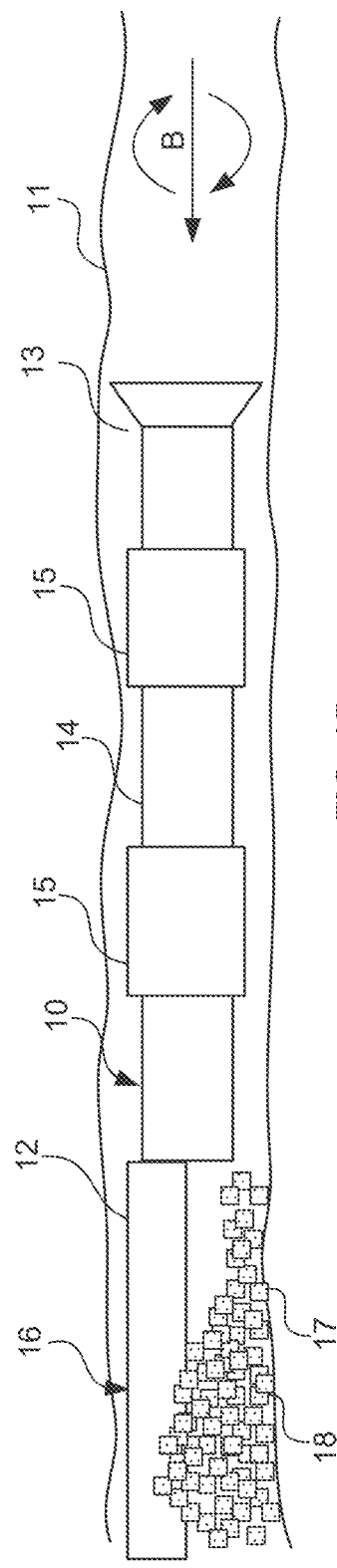
FIG. 1A (Prior Art)
FIG. 1B (Prior Art)

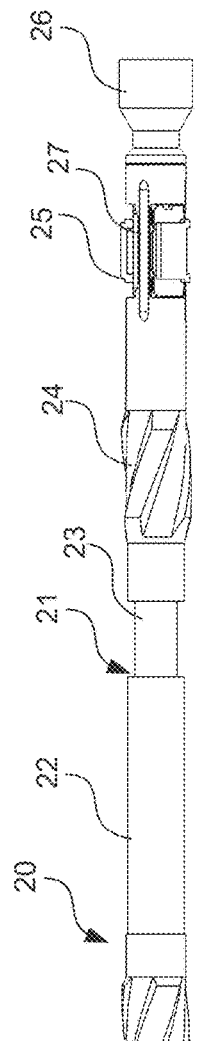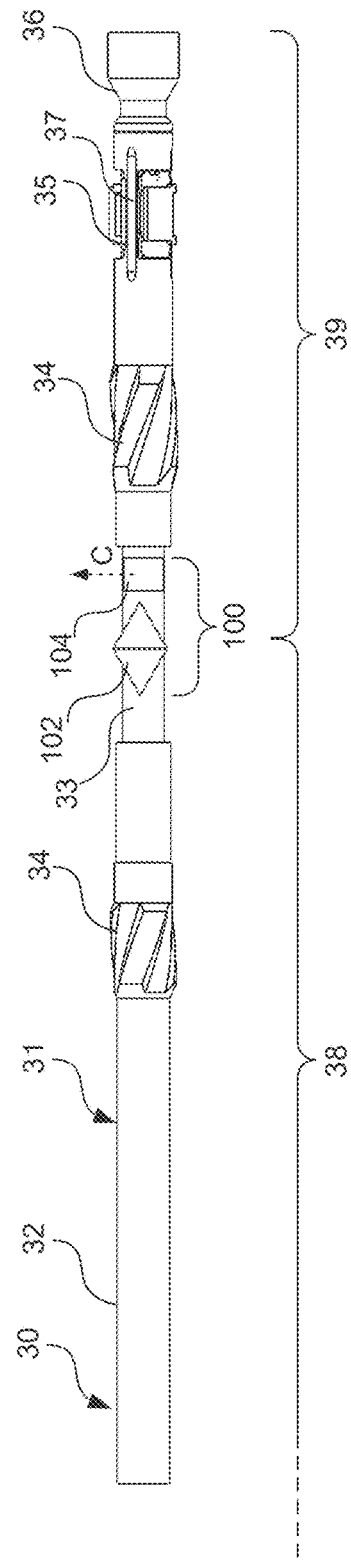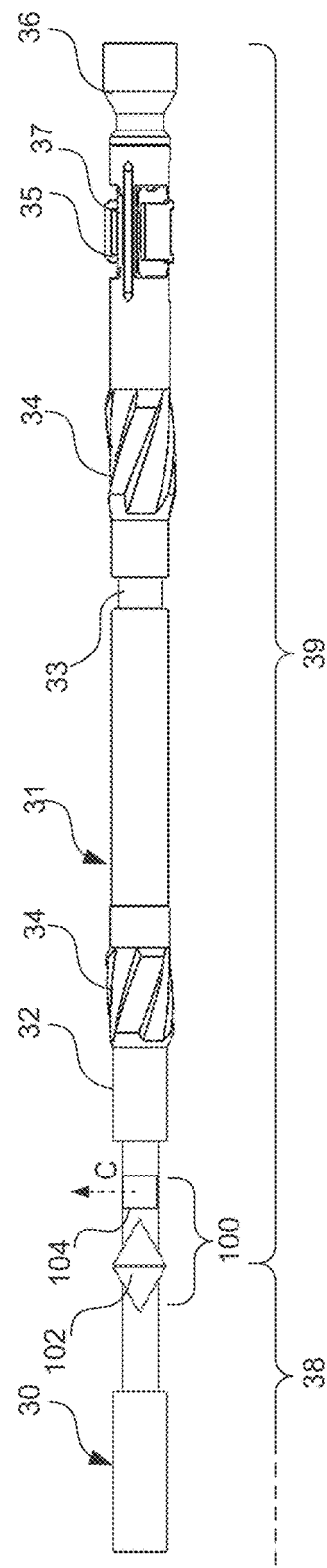
FIG. 2 (Prior Art)
FIG. 3A
FIG. 3B

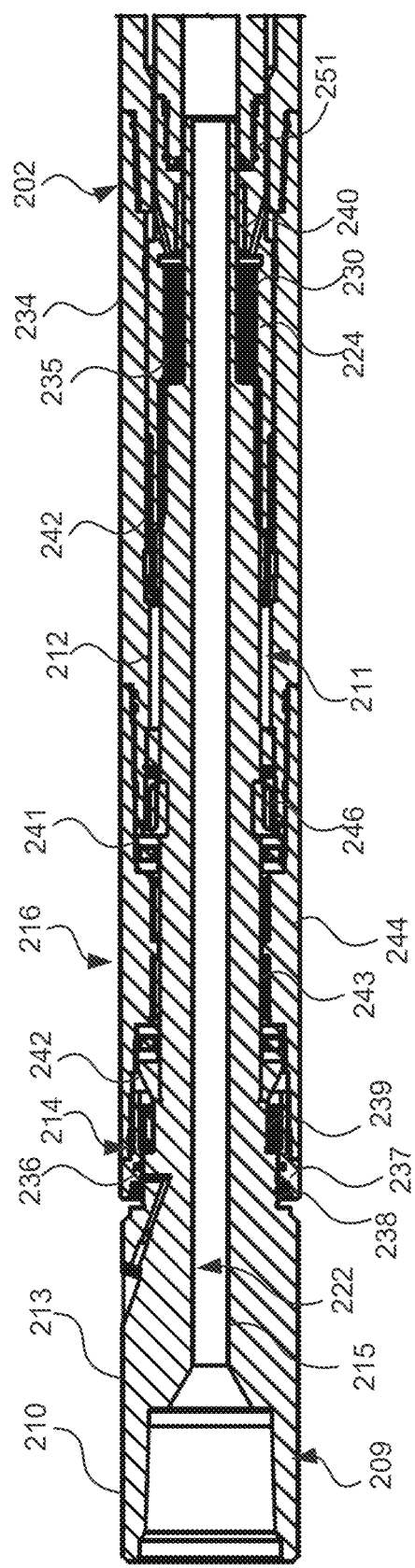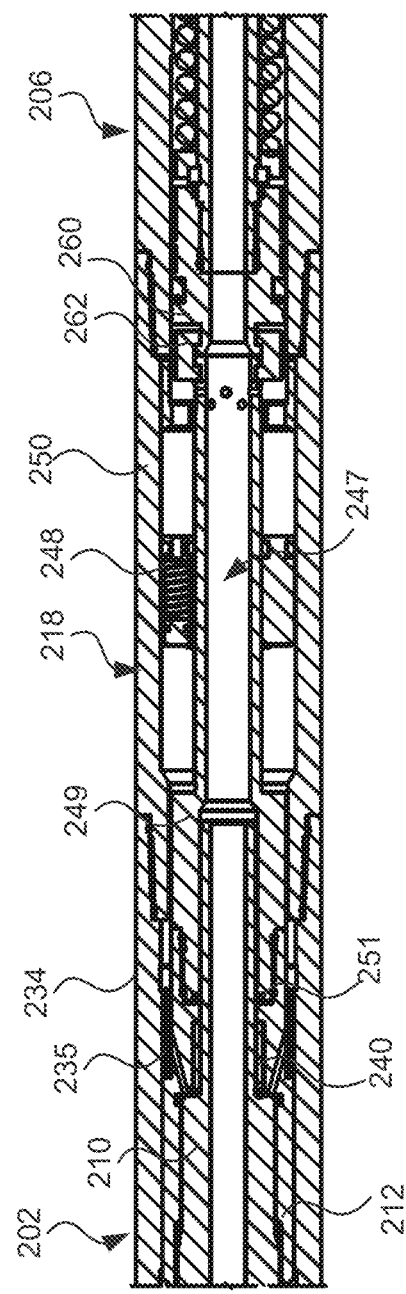
FIG. 5A
FIG. 5B

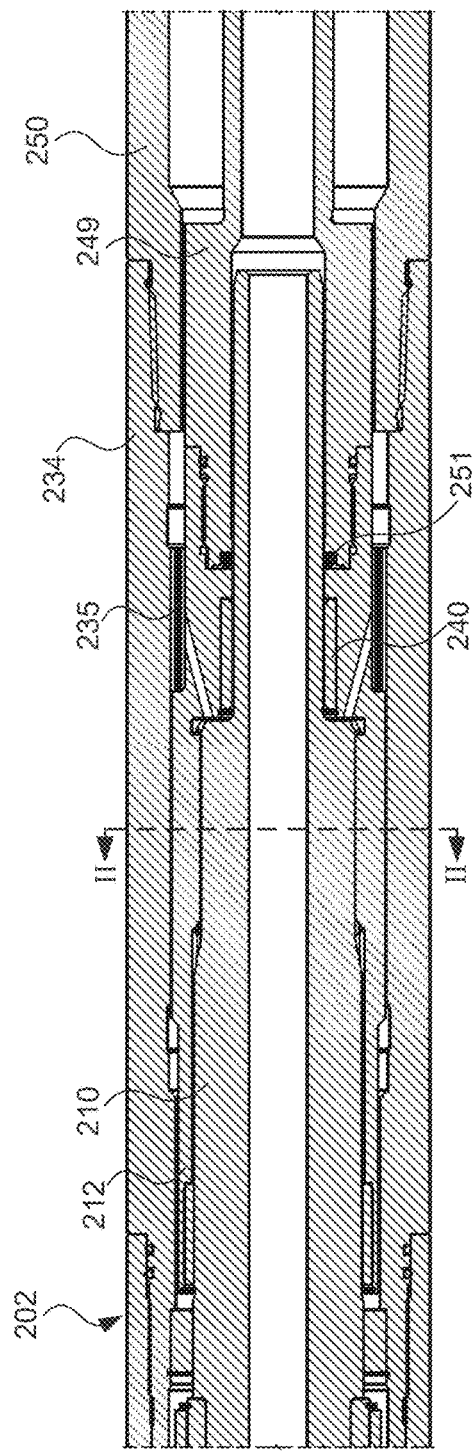
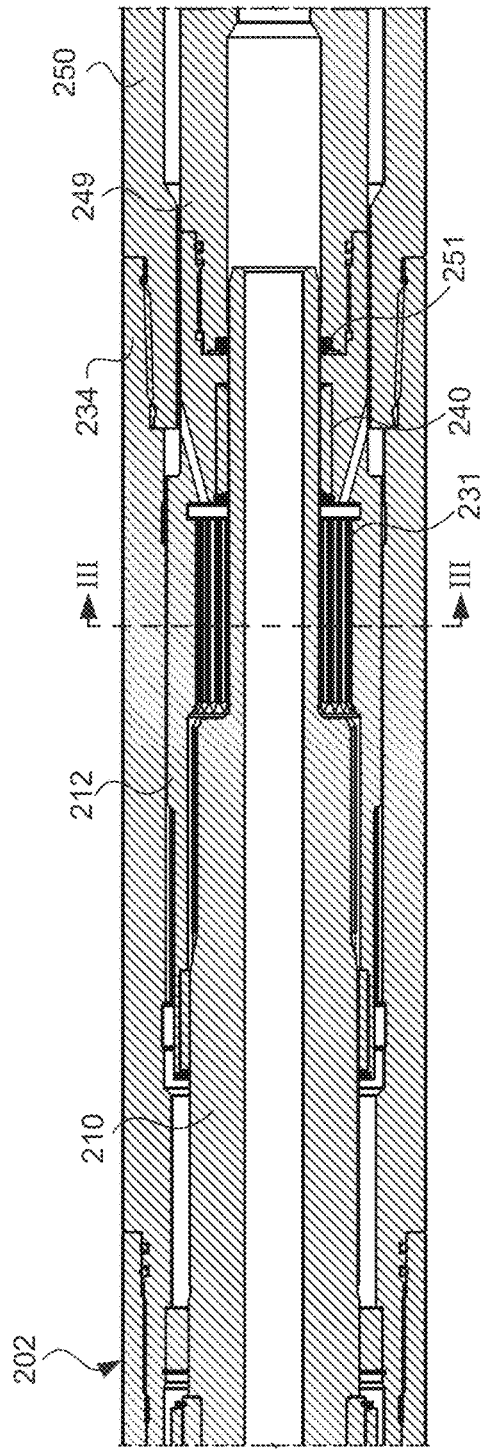
FIG. 8A
FIG. 8B

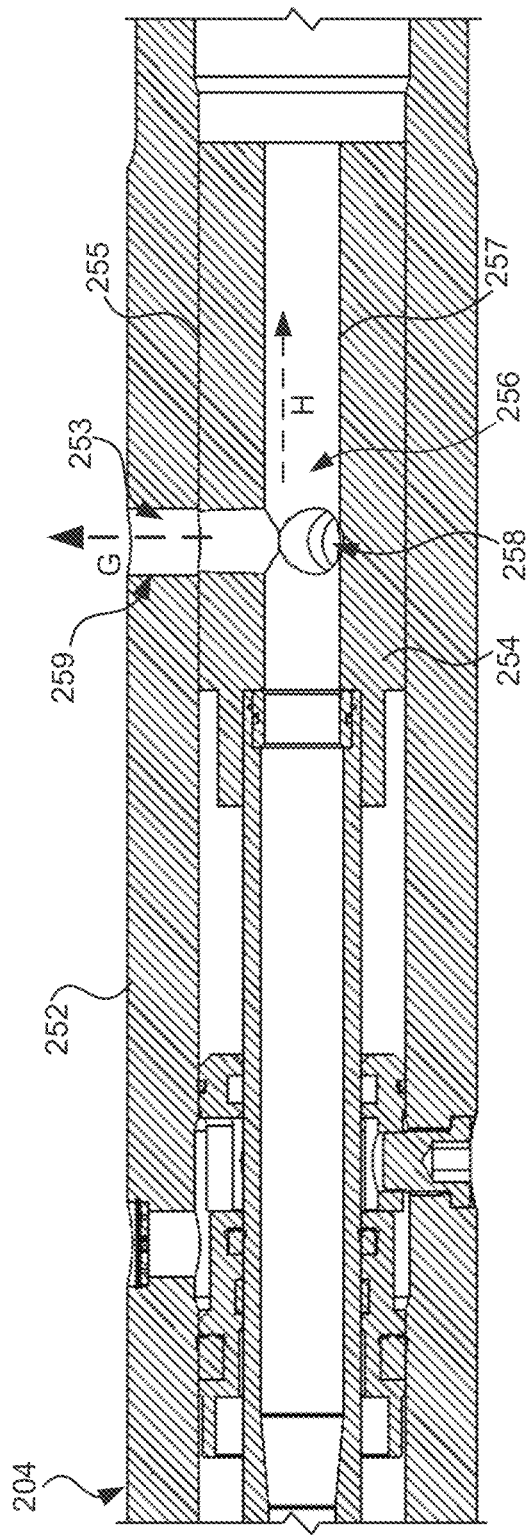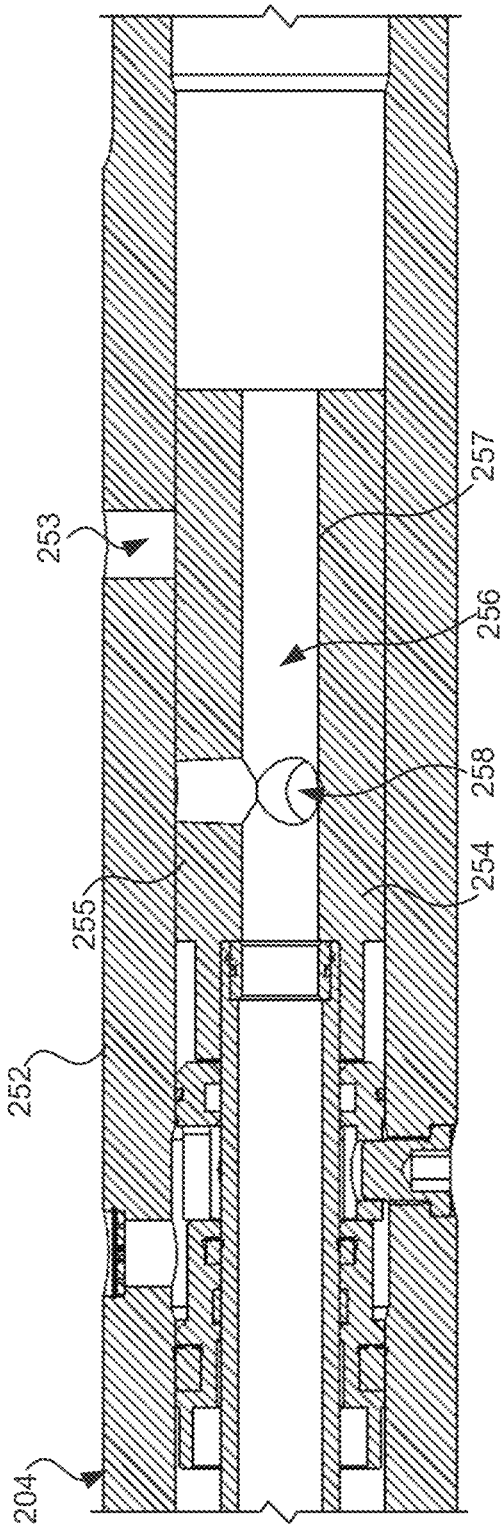

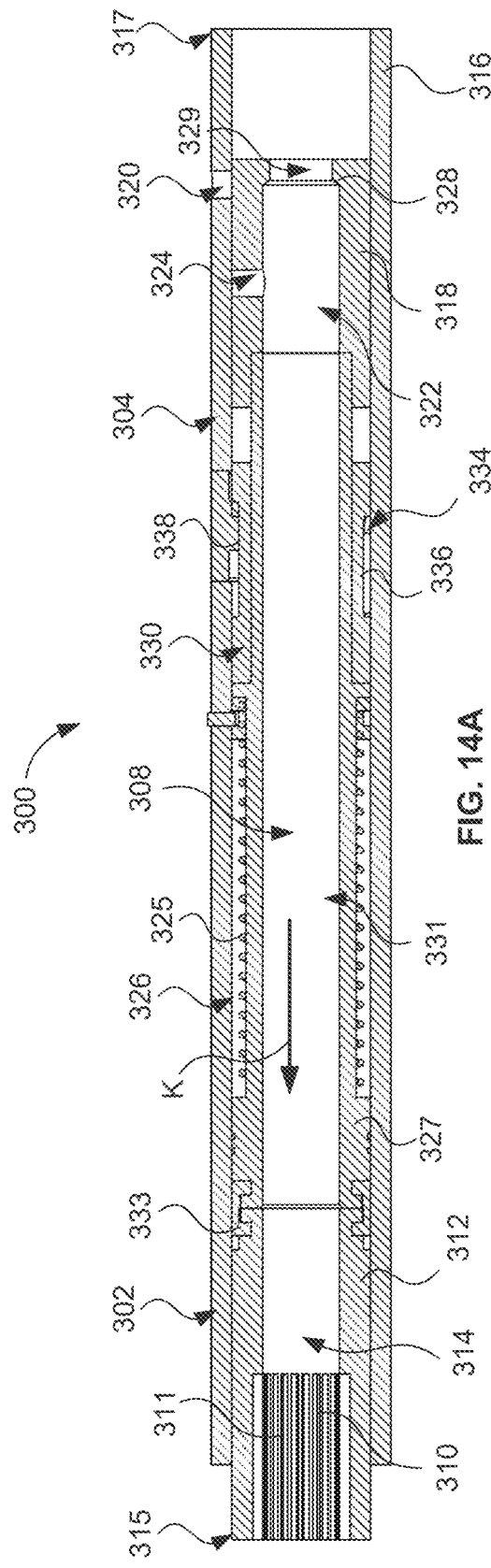
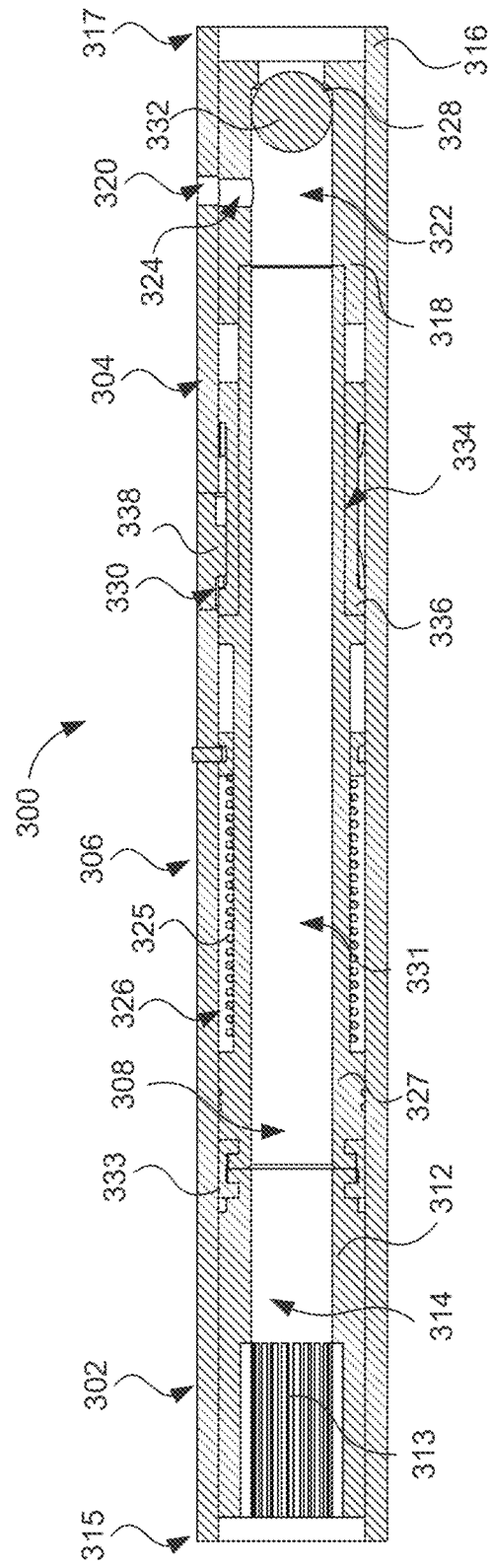
FIG. 14A
FIG. 14B

CLUTCH ASSEMBLY AND RELATED SYSTEMS AND METHODS

RELATED APPLICATION

The present disclosure is a continuation of U.S. patent application Ser. No. 17/977,678, filed Oct. 31, 2022, which claims priority to U.S. Provisional Patent Application No. 63/321,166, filed Mar. 18, 2022, each of which is incorporated herein by reference.

TECHNICAL FIELD

The present disclosure relates to drilling systems. More particularly, the present disclosure relates to clutch assemblies and related systems and methods for drilling boreholes.

BACKGROUND

To access subterranean deposits of resources such as oil and gas, a borehole may be drilled into an earth formation using a drill string. A typical drill string comprises a bottomhole assembly (BHA) including a drill bit that drills the borehole and a length of drill pipe that extends from BHA to a drilling rig at the surface. Drilling a borehole may include non-directional drilling and/or directional drilling. Directional drilling is required for drilling deviated or horizontal boreholes. Directional drilling typically involves the use of a BHA that includes a steerable drilling system, such as a rotary steerable drilling tool or a steerable drilling motor.

As the borehole is drilled, the drill bit will start to wear, which may lead to sections of the borehole being narrower than required ("undergauge"). Undergauge sections of the borehole may also occur due to "caving" of the borehole or if drill cuttings become stuck or compressed on the BHA, which causes poor circulation of drilling fluids. When the drill string is pulled ("tripped") out of the borehole, the drill pipe may get stuck at an undergauge section, which places significant stress on the BHA, including expensive components such as a rotary steerable. While good drilling practice and proper BHA selection help to mitigate this issue, "pumping out" and/or "back reaming" are often still required to try to remove a stuck drill pipe.

FIG. 1A is a side view schematic of a portion of a conventional drill string 10 in a horizontal section of a borehole 11. The drill string 10 in this example comprises drill pipe 12 (only a portion of which is shown in FIG. 1A) and a BHA 14 including a drill bit 13 and stabilizers 15. During normal drilling operations, the drill string 10 is rotated while drilling fluid ("mud") is pumped downhole through the drill pipe 12 to the drill bit 13. The drilling fluid is circulated back uphole through an annulus 16 between the drill string 10 and the sidewall of the borehole 11. Drill cuttings 17 will settle along the bottom of the borehole 11, below the drill string 10.

During a typical tripping out procedure, the drill string 10 is pulled in the uphole direction, as indicated by arrow "A", without rotation or circulation. If a tight spot is encountered, rotation and circulation are reinitiated and the BHA will act as a conveyor to move cuttings 17 uphole. After a short period (e.g., 30 minutes), circulation and rotation will cease again and the drill string 10 will be carefully pulled out of hole while monitoring for other obstructions.

FIG. 1B shows the drill string 10 and borehole 11 of FIG. 1A during a typical back reaming procedure. During back reaming, the drill string 10 is rotated while it is pulled uphole (as indicated by arrows B in FIG. 1B) and drilling fluid is pumped through the drill pipe 12 at a drilling flow rate to help disperse the cuttings 17 above the BHA 14. Cuttings 17 will gradually drop out to form a dune 18 above the BHA 14. The BHA 14 will be gradually advanced uphole using torque to monitor the pulling speed of the drill string 10. However, back reaming may still place considerable stress on the BHA.

FIG. 2 is a side view of a portion of a conventional drill string 20 with a "mud motor above rotary steerable" (MARS) BHA 21. The BHA 21 includes a mud motor 22, a driveshaft 23, instrument collars 24, and a "push the bit" rotary steerable system (RSS) 25 configured to steer the drilling direction of a drill bit 26. The RSS 25 comprises biasing pads 27 that are inflated by the flow of drilling fluid through the BHA 21. The drill bit 26 is operated by rotation of the drill string 10 as well as by the flow of drilling fluid through the mud motor 22, which is operably to drive rotation of the drill bit 26 to increase the RPM (revolutions per minute).

If rotation of the drill string 10 rotation stops, but fluid is still flowing through the mud motor 22, the drill bit 26 still turns and the biasing pads 27 still inflate, which generates drag on the BHA 21. Therefore, in conventional drill strings, trip out and back reaming procedures may subject the BHA 21, including the expensive RSS 25, to destructive forces.

SUMMARY

In one aspect, there is provided a system for a drill string, comprising: a clutch assembly comprising a driveshaft and a shuttle, wherein the shuttle is axially movable between an engaged position in which the shuttle engages the driveshaft, and a disengaged position in which the shuttle is disengaged from the driveshaft; a circulation assembly comprising a tubular housing having at least one first aperture extending radially therethrough and a circulation piston received within the housing, the circulation piston having at least one second aperture extending radially therethrough, wherein the circulation piston is axially movable within the housing between a closed position in which the at least one first and second apertures are axially offset and an open position in which the at least one first and second apertures are axially aligned; and an actuation mechanism operatively connected to the clutch assembly and the circulation assembly, the actuating mechanism selectively actuatable to move the shuttle between the engaged position and the disengaged position and the circulation piston between the closed position and the open position.

In some embodiments, the shuttle is in the engaged position when the circulation piston is in the closed position and the shuttle is in the disengaged position when the circulation piston is in the open position.

In some embodiments, the driveshaft comprises an external surface having a first coupling element, and wherein the shuttle comprises a channel therethrough that receives a portion of the driveshaft and an internal surface having a second coupling element that engages the first coupling element when the shuttle engages the driveshaft.

In some embodiments, the first coupling element comprises a male spline with a plurality of outer teeth and the second coupling element comprises a female spline with a plurality of inner teeth, the outer teeth interlocking with the inner teeth when the shuttle engages the driveshaft.

In some embodiments, the actuation mechanism comprises a pressure-activated actuator.

In some embodiments, the pressure-activated actuator comprises: an activation piston operatively connected to the shuttle and the circulation piston and operable to axially move the shuttle and the circulation piston; a biasing device that exerts a biasing force on the activation piston to maintain the shuttle in the engaged position and the circulation piston in the closed position; a pressure differential mechanism that provides a pressure differential within the system downhole of the biasing device; and wherein, when the pressure differential reaches a pre-determined threshold, the activation piston overcomes the biasing force to axially move the shuttle to the disengaged position and the circulation piston to the open position.

In some embodiments, the pressure differential mechanism comprises a flow restrictor.

In some embodiments, the actuation mechanism comprises: a mandrel coupled between the shuttle and the circulation piston and axially movable therewith; a biasing device that exerts a biasing force on the mandrel to maintain the shuttle in the engaged position and the circulation piston in the closed position; a valve seat to receive a ball thereon, the valve seat positioned downhole of the biasing device; and wherein, when the ball is seated on the valve seat, the mandrel overcomes the biasing force to axially move the shuttle to the disengaged position and the circulation piston to the open position.

In some embodiments, the biasing device comprises a spring.

In some embodiments, the actuation mechanism comprises at least one electric motor assembly operatively connected to at least one of the clutch assembly and the circulation assembly.

In some embodiments, the indexing mechanism comprises a barrel cam assembly.

In another aspect, there is provided a drill string comprising: an uphole portion rotatable from surface and a downhole portion comprising a rotary steerable system and a drill bit; a mud motor operable to drive rotation of the drill bit; and a clutch and circulation system, the system comprising: a clutch assembly comprising a driveshaft coupled to the uphole portion of the drill string and a shuttle coupled to the downhole portion of the drill string, wherein the shuttle is axially movable between an engaged position in which the shuttle engages the driveshaft such that the downhole portion rotates with the uphole portion, and a disengaged position in which the shuttle is disengaged from the driveshaft such that the uphole portion rotates independently of the downhole portion; a circulation assembly comprising a tubular housing having at least one first aperture extending radially therethrough and a circulation piston received within the housing, the circulation piston having at least one second aperture extending radially therethrough, wherein the circulation piston is axially movable within the housing between a closed position in which the at least one first and second apertures are axially offset and an open position in which the at least one first and second apertures are axially aligned; and an actuation mechanism operatively connected to the clutch assembly and the circulation assembly, the actuating mechanism selectively actuatable to move the shuttle between the engaged position and the disengaged position and the circulation piston between the closed position and the open position.

In some embodiments, the system is positioned uphole of the mud motor such that the mud motor is in the downhole portion of the drill string.

In some embodiments, the system is positioned downhole of the mud motor such that the mud motor is in the uphole portion of the drill string.

In another aspect, there is provided a method for drilling a borehole comprising: providing a drill string comprising a clutch and circulation system, the system comprising: a clutch assembly coupling the uphole portion of the drill string to the downhole portion, the clutch assembly having an engaged position in which rotation of the uphole portion rotates the downhole portion, and a disengaged position in which the uphole portion rotates independently of the downhole portion; a circulation assembly having an exhaust port, the circulation assembly having an open position in which the exhaust port is open and a closed position in which the exhaust port is closed; and an actuation mechanism operatively connected to the clutch assembly and the circulation assembly, the actuation mechanism selectively actuatable to move the clutch assembly between the engaged position and the disengaged position and the circulation assembly between the open position and the closed position; and drilling the borehole with the clutch assembly in the engaged position and the circulation assembly in the closed position.

In some embodiments, the method further comprises actuating the clutch assembly to the disengaged position and the circulation assembly to the open position.

In some embodiments, the method further comprises at least one of back reaming through the borehole and tripping out the drill string, with the clutch assembly in the disengaged position and the circulation assembly in the open position.

In another aspect, there is provided a clutch assembly for a drill string comprising: a driveshaft connectable to a first portion of the drill string, the driveshaft comprising an axial bore therethrough and an external surface having a first coupling element; a tubular shuttle connectable to a second portion of the drill string downhole from the first portion, the tubular shuttle comprising a channel therethrough that receives a portion of the driveshaft and an internal surface having a second coupling element that engages the first coupling element; and wherein the tubular shuttle is axially movable between an engaged position in which the first coupling element engages the second coupling element and the driveshaft drives rotation of the shuttle, and a disengaged position in which the first and second coupling elements are disengaged and the tubular shuttle is not rotatable by the driveshaft.

In some embodiments, the first coupling element comprises a male spline with a plurality of outer teeth and the second coupling element comprises a female spline with a plurality of inner teeth, the outer teeth interlocking with the inner teeth when the tubular shuttle engages the driveshaft.

Other aspects and features of the present disclosure will become apparent, to those ordinarily skilled in the art, upon review of the following description of the specific embodiments of the disclosure.

BRIEF DESCRIPTION OF THE DRAWINGS

Some aspects of the disclosure will now be described in greater detail with reference to the accompanying drawings. In the drawings:

FIG. 1A is a side view schematic of a portion of a prior art drill string in a horizontal section of a borehole during a tripping out procedure;

FIG. 1B is a side view schematic of the drill string and the borehole of FIG. 1A during a back reaming operation;

FIG. 2 is a partial side view of a prior art "mud motor above rotary steerable" (MARS) bottom hole assembly (BHA);

FIG. 3A is a side view schematic of a portion of drill string with a MARS BHA including an example clutch and circulation system, according to some embodiments, shown positioned below the mud motor;

FIG. 3B is a side view schematic of a portion of the drill string of FIG. 3A, shown with the system positioned below the mud motor;

FIGS. 5A and 5B are partial, enlarged, cross-sectional views of a clutch assembly of the system of FIG. 4;

FIGS. 8A and 8B are partial, enlarged, cross-sectional views of the clutch assembly of FIGS. 5A-5B shown in an engaged and a disengaged position, respectively;

FIGS. 10A and 10B are partial, enlarged, cross-sectional views of a circulation assembly of the system of FIG. 4 shown in an open position and a closed position, respectively;

FIGS. 14A and 14B are partial cross-sectional views of an alternative embodiment of a clutch and circulation system, according to some embodiments;

DETAILED DESCRIPTION

Figure 4:
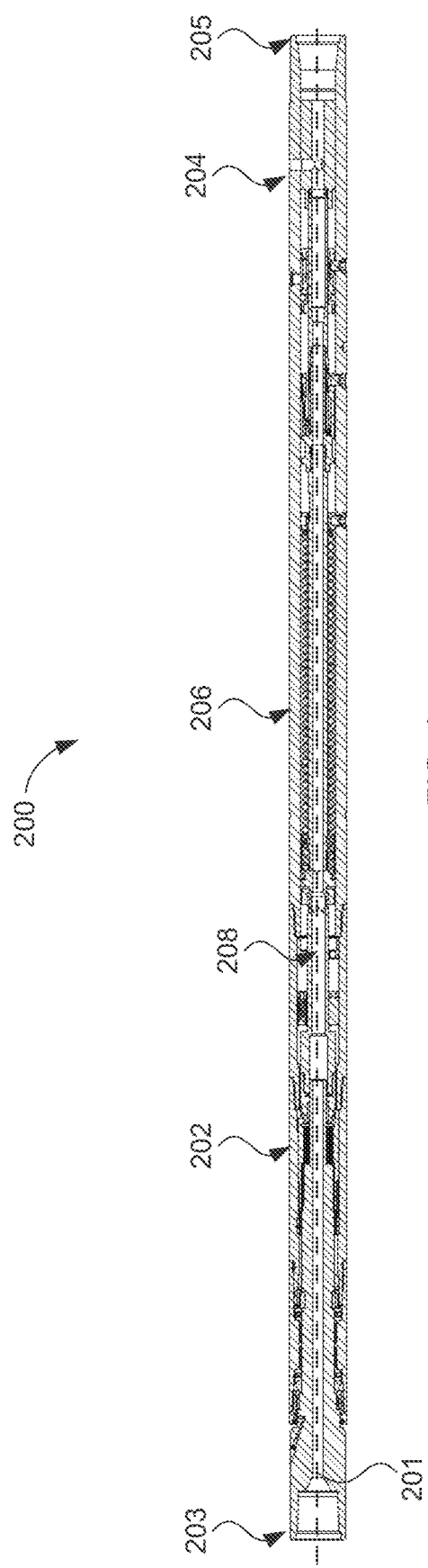
FIG. 4 is a side, cross-sectional view of an example clutch and circulation system according to some embodiments.

Generally, the present disclosure provides a clutch assembly and a related clutch and circulation system. In some embodiments, the system comprises the clutch assembly, a circulation assembly, and an actuation mechanism operatively connected to the clutch assembly and the circulation assembly. In some embodiments, the clutch assembly allows for selective rotation of a bottom hole assembly of a drill string and the circulation assembly allows for selective exhausting of drilling fluid from the drill string. Related methods are also provided.

As used herein the terms "a," "an", and "the" may include plural referents unless the context clearly dictates otherwise.

In this disclosure, the term "upward" may be used to refer to the "uphole" direction, where the "uphole" direction refers to the direction toward the surface in a borehole or well. The term "downward" may be used to refer to the "downhole" direction, where the "downhole" direction refers to the direction toward the bottom (or toe) of the borehole or well (i.e., opposite to the uphole direction).

As used herein, the terms "engaged" or "coupled" are intended to encompass components that are directly connected to one another as well as components that are indirectly connected with one or more other components therebetween, unless the context clearly dictates otherwise.

The clutch assemblies and systems disclosed herein may be incorporated into drill string including, for example, as part of a bottom-hole assembly (BHA). The BHA may be any suitable BHA in the art. In some embodiments, the assembly and/or system is incorporated into a BHA that includes a rotary steerable system (RSS). In some embodiments, the assembly and/or system is incorporated into a "mud motor above rotary steerable" (MARS) BHA.

FIG. 3A is a side view schematic of a portion of a drill string 30 with a MARS BHA 31 including an example clutch and circulation system 100, according to some embodiments. The drill string 30 is configured to be positioned in a borehole (not shown) with an annulus therebetween. The drill string 30 is similar in structure to the drill string 20 of FIG. 2 and comprises a mud motor 32, a driveshaft 33, instrument collars 34, and a "push the bit" RSS 35 configured to steer the drilling direction of a drill bit 36. The RSS 35 comprises biasing pads 37. An axial passage (not shown) extends through the BHA 31 to convey drilling fluid to the RSS 35 and the drill bit 36.

In this embodiment, the system 100 is positioned downhole of the mud motor 32 and uphole of the RSS 35. The system 100 may comprise a clutch assembly 102, a circulation assembly 104, and an actuation assembly (not shown). The clutch and circulation assemblies 102 and 104 are shown in a simplified manner in FIG. 3A for illustrative purposes only and their structure will be discussed in more detail below.

The clutch assembly 102 effectively divides the drill string 30 into an uphole portion 38 (i.e., the portion of the drill string 30 extending upwards of the clutch assembly 102 towards the drilling rig) and a downhole portion 39 (i.e., the remainder of the drill string 30 extending downhole of the clutch assembly 102 to the drill bit 36). The clutch assembly 102 couples the uphole portion 38 to the downhole portion 39 and is movable between an engaged position and a disengaged position. When the clutch assembly 102 is in the engaged position, the downhole portion 39 of the drill string 30 is engaged with the uphole portion 38 such that rotation of the uphole portion 38 rotates the downhole portion 39. When the clutch assembly 102 is in the disengaged position, the uphole portion 38 and the downhole portion 39 are disengaged such that the uphole portion 38 rotates independently of the downhole portion 39.

The circulation assembly 104 includes an exhaust port (not shown) in fluid communication with the axial passage. The circulation assembly 104 is movable between an open position and a closed position. In the open position, the port is open and in fluid communication with the annulus between the drill string 30 and the borehole such that drilling fluid in the axial passage of the BHA is at least partially diverted into the annulus. In the closed position, the port is closed and not in fluid communication with the annulus and drilling fluid flows through the axial passage to the RSS 35 and the drill bit 36 without being diverted to the annulus.

The actuation mechanism is operatively connected to the clutch assembly 102 and the circulation assembly 104. The actuation mechanism is selectively actuatable to move the clutch assembly 102 between the engaged position and the disengaged position and to move the circulation assembly 104 between the closed position and the open position. In other embodiments, the actuation mechanism may comprise two individual mechanisms that independently actuate the clutch assembly 102 and the circulation assembly 104.

During normal drilling operations, the clutch assembly 102 is in the engaged position and the circulation assembly 104 is in the closed position. The downhole portion 39 of the drill string 30 rotates with the uphole portion 38, aided by the mud motor 32, and drilling fluid flows through the BHA to the biasing pads 37 of the RSS 35 and the drill bit 36.

To switch from normal drilling to a tripping out or back reaming procedure, the actuation mechanism may be actuated to move the clutch assembly 102 to the disengaged position and the circulation assembly 104 to the open position. With the clutch assembly 102 in the disengaged position, the downhole portion 39 is no longer rotatable by rotation of the uphole portion 38 (or by the mud motor 32) and thus the RSS 35 and the drill bit 36 substantially cease rotation. With the circulation assembly 104 in the open position, fluid flowing through the BHA 31 is at least partially diverted to the annulus via the port of the circulation assembly 104 as indicated by arrow "C" in FIG. 3A. By diverting fluid flow to the annulus, flow to the biasing pads 37 of the RSS 35 is substantially reduced or effectively zero such that the force exerted by the biasing pads 37 is also substantially reduced or effectively zero, thereby reducing the drag on the BHA 31 as the drill string 30 is pulled uphole. By reducing drag, the stress on the BHA 31 is therefore reduced, thereby preventing or reducing damage to the BHA 31 (including the expensive RSS 35) while the drill string 30 is pulled uphole.

An alternative configuration of the drill string 30 with the system 100 is shown in FIG. 3B. In this embodiment, the system 100 is positioned uphole of the mud motor 32 such that the downhole portion 39 of the drill string 30 below the clutch assembly 102 includes the mud motor 32, the RSS 35, and the drill bit 36 together. During normal drilling operation, this configuration would operate in a similar manner to that described above for the configuration of FIG. 3A.

In this configuration, during tripping out or back reaming operations, the clutch assembly 102 is in the disengaged position such that the entire BHA 31 from the mud motor 32 to the drill bit 36 no longer rotates with the uphole portion 38 of the drill string 30. The circulation assembly 104 is in the open position such that at least a portion of the drill fluid is diverted to the annulus as indicated by arrow "C" in FIG. 3B. However, as the mud motor 32, the RSS 35, and the drill bit 36 are all connected in the downhole portion 39, if fluid flow is only partially diverted to the annulus, the remaining fluid will flow through the mud motor 32 to the RSS 35 and the drill bit 36, which may allow the mud motor 32 to continue to rotate the RSS 35 and the drill bit 36 independently of the uphole portion 38. The configuration of FIG. 3B may therefore be useful in certain applications where it is desirable to reduce the drag on the BHA while still allowing some rotation of the RSS 35 and the drill bit 36.

In alternative embodiments, the circulation assembly 104 of the system 100 in FIGS. 3A and 3B may be omitted and just the clutch assembly 102 may be used to engage and disengage rotation of the downhole portion 39 of the drill string 30 as desired.

In addition to tripping out and back reaming procedures, the system 100 (with or without the circulation assembly 104) may also be used for various other applications including reaming while going into the hole, liner/casing installation while drilling application, and/or any other applications in which it may be advantageous to not rotate the RSS and/or the drill bit while rotating the rest of the drill string.

An example clutch and circulation system 200 will be discussed in more detail with reference to FIGS. 4 to 13B. The system 200 is configured to be incorporated into a drill string with a BHA including an RSS and a drill bit (not shown) such as the drill string 30 of FIGS. 3A and 3B. In use, the drill string, including the system 200, would be positioned in a borehole (not shown) with an annulus therebetween.

As shown in FIG. 4, the system 200 comprises a clutch assembly 202, a circulation assembly 204, and an actuation mechanism 206. The system 200 has an uphole end 203, a downhole end 205, and a longitudinal axis 201. As used herein, the terms "axial" and "longitudinal" are intended to refer to the approximate direction of the longitudinal axis 201. An axial passage 208 extends through the system 200 along the longitudinal axis 201 from the uphole end 203 to the downhole end 205 to allow drilling fluid to flow through the system 200 to the RSS and drill bit (not shown).

The clutch assembly 202 will be described in more detail with reference to FIGS. 5A to 9. The clutch assembly 202 has an engaged (closed) position and a disengaged (open) position, as described in more detail below. The clutch assembly 202 is shown in the disengaged position in FIGS. 4 and 8B and in the engaged position in FIGS. 5A/5B, and 8A.

Referring to FIGS. 5A and 5B, the clutch assembly 202 in this embodiment comprises a clutch driveshaft 210 (also referred to as a mandrel) and a shuttle 212 that movably engages the driveshaft 210. The driveshaft 210 has a base portion 209 and a shaft portion 211. The base portion 209 is configured to engage an uphole component of the drill string, such as a section of drill pipe or a mud motor. The portion of the drill string extending in the uphole direction from the driveshaft 210 will be referred to as the "uphole portion" herein. Rotation of the uphole portion of the drill string rotates the driveshaft 210.

Figure 6A:
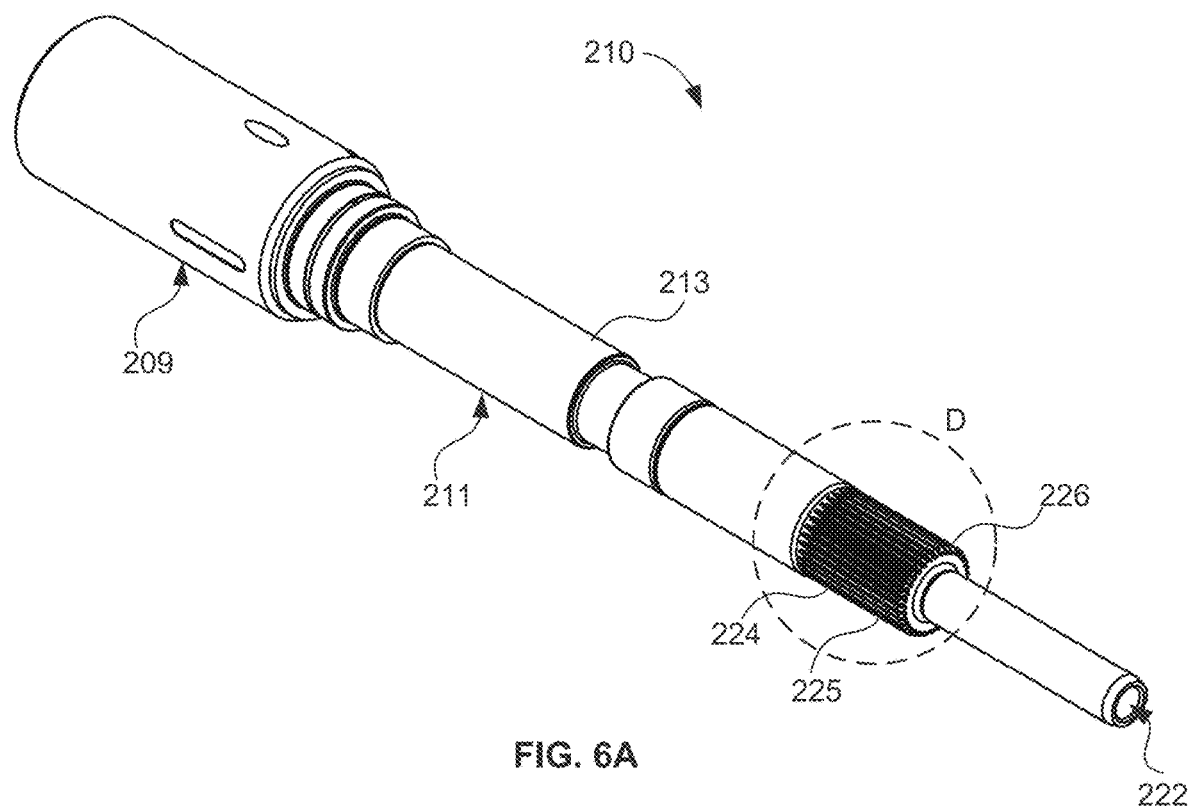
FIG. 6A is a perspective view of a driveshaft of the clutch assembly of FIGS. 5A-5B.
Figure 6B:
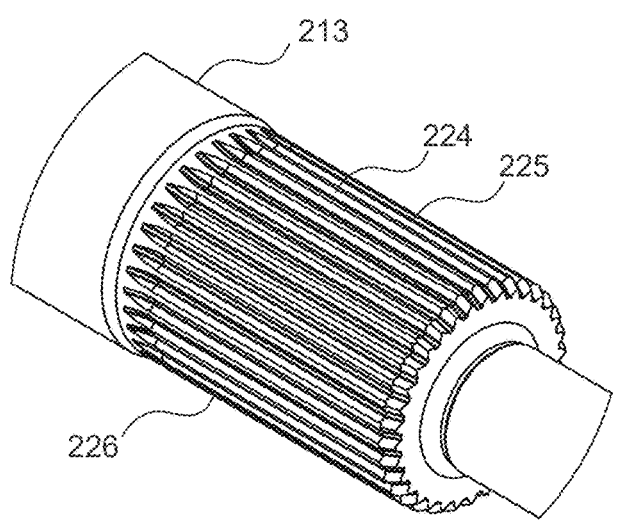
FIG. 6B is an enlarged view of the portion of the driveshaft circled in circle D of FIG. 6B.

The driveshaft 210 has an outer surface 213 and an inner surface 215. The inner surface 215 defines an axial bore 222 that extends longitudinally through the driveshaft 210 and forms part of the overall axial passage 208 of the system 200. The outer surface 213 of the driveshaft 210 further comprises a first coupling element 224 for coupling to the shuttle 212. As shown in FIGS. 6A and 6B, the first coupling element 224 comprises a male spline 225 having a plurality of outer teeth 226 on the outer surface 213 of the driveshaft 210.

Figure 7A:
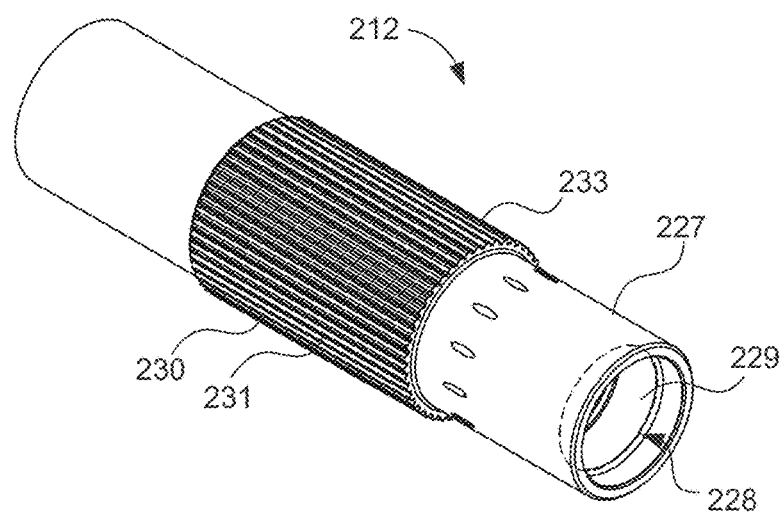
FIGS. 7A and 7B are perspective and side views, respectively, of a shuttle of the clutch assembly of FIGS. 5A-5B.
Figure 7B:
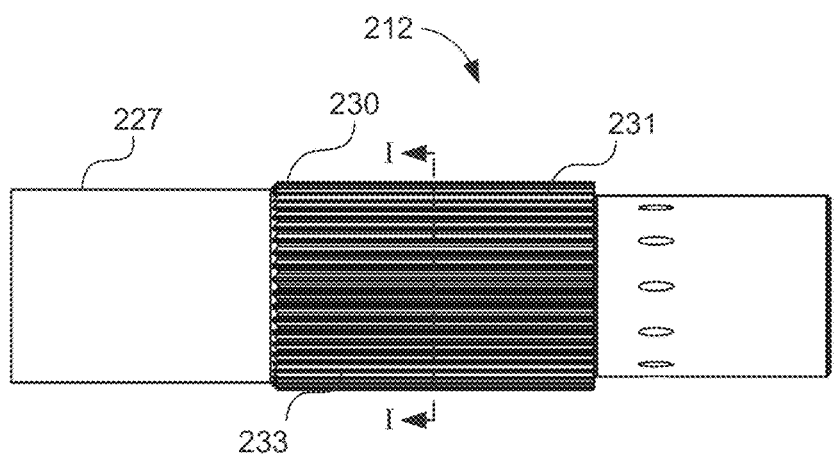
Figure 7C:
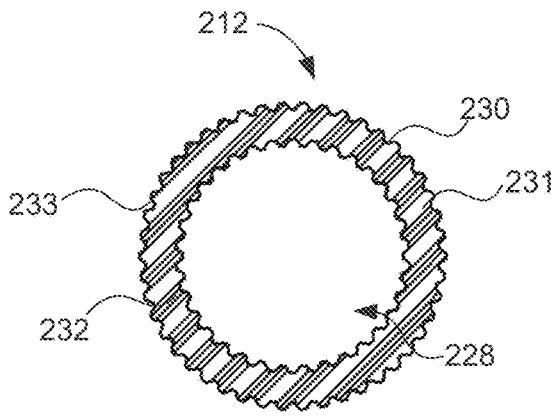
FIG. 7C is a cross-sectional view of the shuttle taken along line I-I in FIG. 7B.

Referring to FIGS. 7A to 7C, the shuttle 212 is approximately tubular in shape and has an outer surface 227 and an inner surface 229. The inner surface 229 defines a channel 228 extending through the shuttle 212 (the channel 228 is visible in FIGS. 7A and 7C). The channel 228 is dimensioned to receive the shaft portion 211 of the driveshaft 210 with the first coupling element 224. A spline bearing 240 (visible in FIG. 5A) is received within the channel 228 to provide radial support for the shuttle 212. The shuttle 212 comprises a second coupling element 230 that engages the first coupling element 224. In this embodiment, the second coupling element 230 comprises a female spline 231 having a plurality of inner teeth 232 that interlock with the outer teeth 226 of the male spline 225 (the inner teeth 232 are visible in FIG. 7C). The female spline 231 further comprises a plurality of outer teeth 233.

The shuttle 212 is received within a shuttle housing 234. In this embodiment, the shuttle housing 234 is a spline sleeve having a plurality of inner teeth 235 (visible in FIGS. 5A and 8A) that interlock with the outer teeth 233 of the female spline 231. The shuttle 212 is axially movable within the housing 234 between an uphole (engaged) position and a downhole (disengaged) position. Movement of the shuttle 212 between the uphole and downhole positions determines whether the clutch assembly 202 is in the engaged position or disengaged position, respectively.

Figure 9A:
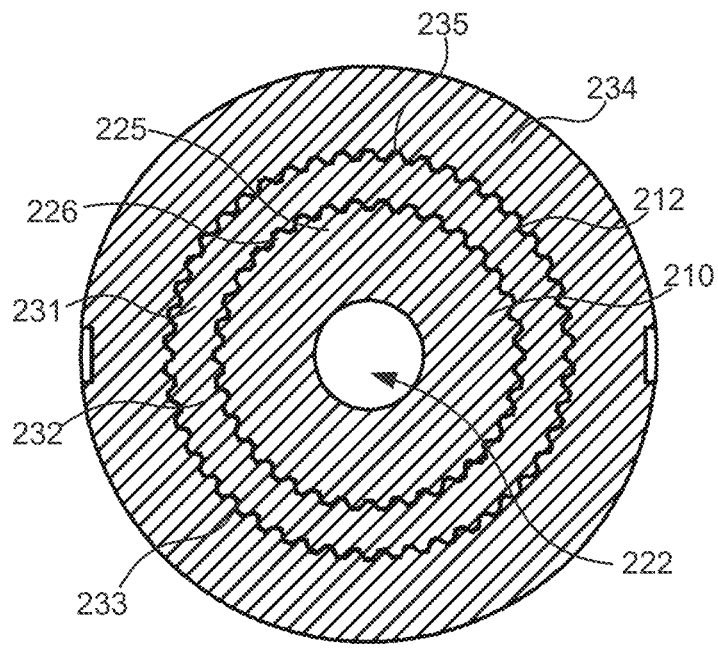
FIG. 9A is a cross-sectional view taken along line II-II in FIG. 8A.

FIG. 8A shows the clutch assembly 202 in the engaged position with the shuttle 212 in the uphole/engaged position. When the shuttle 212 is in the uphole position, the male spline 225 of the driveshaft 210 is received within the female spline 231 of the shuttle 212 such that the outer teeth 226 of the male spline 225 interlock with the inner teeth 232 of the female spline 231. The outer teeth 233 of the female spline in turn interlock with the inner teeth 235 of the shuttle housing 234. Therefore, in this position, rotation of the driveshaft 210 drives rotation of the shuttle 212 which in turn drives rotation of the shuttle housing 234. FIG. 9A is a cross-sectional view taken along line F-F in FIG. 8A showing the female spline 231 engaged with the male spline 225.

Figure 9B:
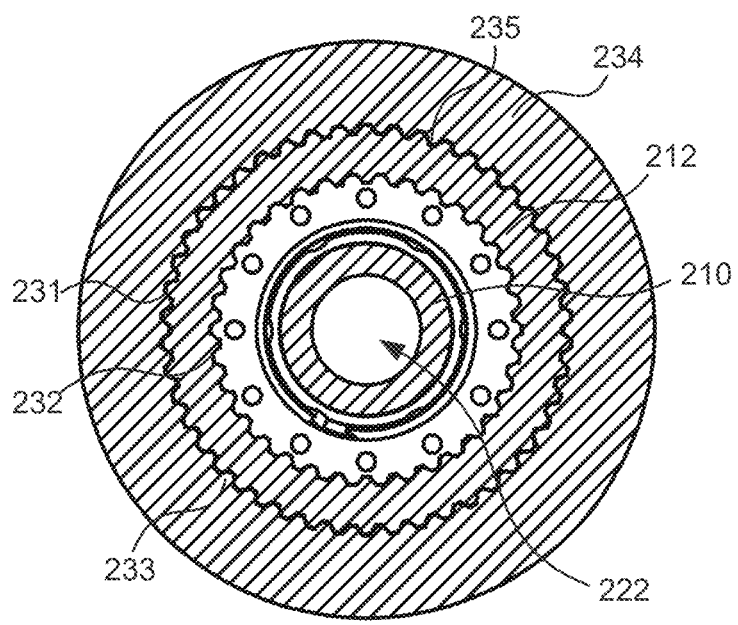
FIG. 9B is a cross-sectional view taken along line III-III in FIG. 8B.

FIG. 8B shows the clutch assembly 202 in the disengaged position with the shuttle 212 in the downhole/disengaged position. When the shuttle 212 is in the downhole position, the female spline 231 portion of the shuttle 212 is displaced from the male spline 225 of the driveshaft 210 such that the outer teeth 226 of the male spline 225 are displaced from the inner teeth 232 of the female spline 231. When the female spline 231 is displaced from the male spline 225, the driveshaft 210 rotates independently of the shuttle 212. FIG. 9B is a cross-sectional view taken along line L-L in FIG. 8B showing the female spline 231 displaced from the male spline 225.

Referring again to FIGS. 5A and 5B, the clutch assembly 202 in this embodiment further comprises a rotary seal assembly 214, a bearing assembly 216, and a balance piston assembly 218.

The rotary seal assembly 214 is positioned around the shaft portion 211 of the driveshaft 210 proximate to the base portion 209. The rotary seal assembly 214 is configured to isolate the internal components of the clutch assembly 202 from oil in the borehole. The rotary seal assembly 214 in this embodiment comprises a main rotary seal 236 that is sealingly and rotatably engaged with the driveshaft 210 and a rotary seal carrier 237 that supports the main rotary seal 236. In some embodiments, an excluder seal 238 is positioned uphole of the main rotary seal 236 to protect the main rotary seal 236 from oil and other debris in the borehole. A seal carrier bearing 239 may be disposed between the rotary seal carrier 237 and the shaft portion 211 of the driveshaft 210 to keep the driveshaft 210 and the rotary seal carrier 237 concentric. The bearing 239 is essentially frictionless such that there is no torque transfer from the driveshaft 210 to the rotary seal carrier 237.

The bearing assembly 216 is positioned around the shaft portion 211 of the driveshaft 210 adjacent to the rotary seal assembly 214. The bearing assembly 216 is configured to support the driveshaft 210 with respect to the shuttle housing 234 and the shuttle 212. In this embodiment, the bearing assembly 216 comprises thrust bearings 241, a thrust bearing support 242, clutch bearings 243, and a clutch bearing housing 244. The thrust bearings 241 support the downward force of the drill string (i.e., the "weight-on-bit") and the thrust bearing support 242 supports the thrust bearings 241 against the driveshaft 210. A split ring assembly 246 is mounted to the driveshaft 210 and abuts the thrust bearings 241 to provide support for when the system 200 is pulled out of hole.

The clutch bearings 243 comprise radial bearings that support the driveshaft 210. The clutch bearing housing 244 contains the clutch bearings 243. The clutch bearing housing 244 is coupled to the rotary seal carrier 237 at its uphole end and coupled to the shuttle housing 234 at its downhole end. The clutch bearings 243 do not transfer torque from the driveshaft 210 to the clutch bearing housing 244.

When the clutch assembly 202 is in the engaged position, the driveshaft 210 receives torque (i.e., rotation) from the uphole portion of the drill string and will transfer torque to the shuttle 212, which then transfers torque to the shuttle housing 234. As the shuttle housing 234 is coupled to the clutch bearing housing 244, which is in turn coupled to the rotary seal carrier 237, the shuttle housing 234, the clutch bearing housing 244, and the rotary seal carrier 237 all rotate along with the driveshaft 210 and the shuttle 212. When the clutch assembly 202 is in the disengaged position, the driveshaft 210 rotates independently of the shuttle 212 and, therefore, does not transfer torque to the shuttle 212. As a result, the shuttle housing 234 is stationary and thus the clutch bearing housing 244, and the rotary seal carrier 237 are also stationary.

The balance piston assembly 218 is positioned downhole of the shuttle 212 and comprises a balance piston 248, a balance piston sleeve 249, and a balance piston housing 250. The balance piston sleeve 249 comprises an axial bore 247 extending therethrough that forms part of the axial passage 208. The balance piston 248 is contained within the sleeve 249 and functions to separate drilling mud from oil.

The balance piston sleeve 249 is non-rotatably coupled to the shuttle 212. The balance piston sleeve 249 is axially movable with respect to the balance piston housing 250 such that the sleeve 249 slides with the shuttle 212 when the shuttle 212 moves between the uphole and the downhole positions. The downhole end of the driveshaft 210 slidingly and rotatably engages the uphole end of the balance piston sleeve 249. The balance piston sleeve 249 houses a rotary/sliding seal 251 at its uphole end that sealingly engages the driveshaft 210. The seal 251 is configured to accommodate both rotational movement (i.e., rotation of the driveshaft 210 with respect to the sleeve 249) and sliding movement (i.e., sliding movement of the sleeve 249 with respect to the driveshaft 210).

The balance piston housing 250 contains the balance piston sleeve 249 and the balance piston 248. The balance piston housing 250 is fixedly (non-rotatably) coupled to the shuttle housing 234 such that the balance piston housing 250 rotates with the shuttle housing 234 when the clutch assembly 202 is in the engaged position and is stationary when the clutch assembly 202 is in the disengaged position.

The circulation assembly 204 will be discussed in more detail with reference to FIGS. 10A and 10B. The circulation assembly 204 has an open position (FIG. 10A) and a closed position (FIG. 10B). In this embodiment, the circulation assembly 204 comprises a tubular housing 252 (hereafter also referred to as the "circulation sub" 252) and a circulation piston 254 received within the circulation sub 252. The circulation sub 252 in this embodiment is a single tubular housing; however, in other embodiments, the circulation sub 252 may comprise two or more housings coupled together.

The circulation sub 252 is non-rotatably coupled to the balance piston housing 250 at its uphole end. Therefore, when the clutch assembly 202 is in the engaged position, the circulation sub 252 will rotate together with the balance piston housing 250 and the shuttle housing 234, driven by the shuttle 212 interlocked with the driveshaft 210. The downhole end of the circulation sub 252 is configured to engage another downhole component of the BHA such as a component of an RSS or a mud motor such as in the drill string 30 of FIGS. 3A and 3B. The portion of the drill string extending downwards from the shuttle housing 234 is referred to as the "downhole portion" herein. The downhole portion of the drill string rotates when the clutch assembly 202 is in the engaged position but not when the clutch assembly 202 is in the disengaged position.

The circulation sub 252 comprises one or more first apertures 253 (also referred to as radial ports 253) extending radially therethrough proximate the downhole end. The radial ports 253 are in fluid communication with the annulus of the borehole.

The circulation piston 254 is approximately tubular in shape and has an outer surface 255 and an inner surface 257. The inner surface 257 defines an axial bore 256 that extends through the circulation piston 254. The axial bore 256 forms part of the axial passage 208 that allows fluid to flow through the system 200 towards the drill bit. The circulation piston 254 further comprises one or more second apertures 258 (also referred to as bypass holes 258) that extend radially from the axial bore 256 to the outer surface 255.

The circulation piston 254 is axially movable with respect to the circulation sub 252. The circulation piston 254 can be slid axially between an uphole (closed) position and a downhole (open) position. Movement of the circulation piston 254 between the uphole position and the downhole position determines whether the circulation assembly 204 is in the closed position or open position, respectively.

FIG. 10A shows the circulation assembly 204 in the open position with the circulation piston 254 in the downhole/open position. When the circulation piston 254 is in the downhole position, the bypass holes 258 are axially aligned with the radial ports 253 of the circulation sub 252 such that the axial bore 256 of the circulation piston 254 (and thus the axial passage 208) is in fluid communication with the annulus of the borehole. The combination of the aligned bypass holes 258 and the radial ports 253 thereby form an exhaust port 259. Drilling fluid flowing through the axial bore 256 will be at least partially diverted to the annulus via the exhaust port 259. In this embodiment, the drilling fluid will be substantially diverted to the annulus (as indicated by arrow "G" in FIG. 10A), although some fluid may flow past the exhaust port 259 and continue flowing downhole (as indicated by arrow "H" in FIG. 10A).

FIG. 10B shows the circulation assembly 204 in the closed position with the circulation piston 254 in the uphole/closed position. When the circulation piston 254 is in the uphole position, the bypass holes 258 are axially offset with respect to the radial ports 253 of the circulation sub 252 such that the axial bore 256 (and thus the axial passage 208) is not in fluid communication with the annulus. Drilling fluid flowing through the axial passage 208 will therefore flow through the system 200 towards the RSS and drill bit (not shown) without being diverted to the annulus.

The actuation mechanism 206 is operatively connected to the clutch assembly 202 and the circulation assembly 204. The actuation mechanism 206 will be described in more detail with reference to FIGS. 11 to 13B.

In some embodiments, the actuation mechanism 206 comprises a pressure-activated actuation mechanism. The pressure-activated actuation mechanism in this embodiment comprises an activation piston 260 (visible in FIG. 11), a biasing device 264 (visible in FIG. 11), and a pressure differential mechanism 268 (visible in FIG. 12). In this embodiment, the activation piston 260, biasing device 264, and pressure differential mechanism 268 are received within the circulation sub 252.

Figure 11:
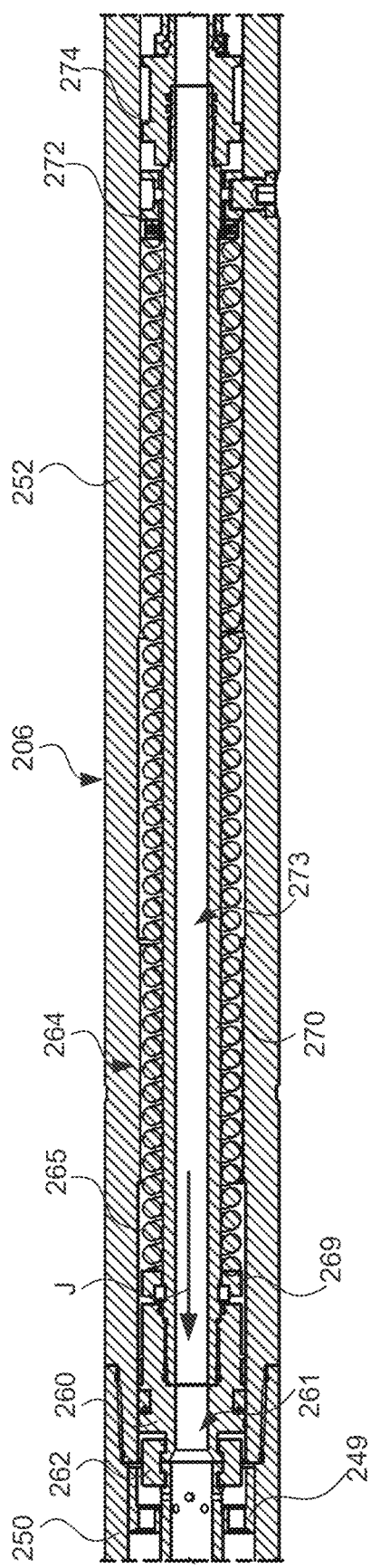
FIGS. 11 and 12 are partial, enlarged, cross-sectional views of an actuation mechanism of the system of FIG. 4.

Referring to FIG. 11, the activation piston 260 is positioned within the circulation sub 252 downhole of the clutch assembly 202. The activation piston 260 comprises an axial bore 261 extending therethrough that forms part of the axial passage 208. A split ring connector 262 connects the activation piston 260 to the clutch assembly 202 via the balance piston sleeve 249. The activation piston 260 is axially movable with respect to the circulation sub 252 between an uphole position (shown in FIGS. 5B and 11) and a downhole position (not shown).

The biasing device 264 is configured to exert a biasing force on the activation piston 260. During normal drilling operation (when the clutch assembly 202 is in the engaged position and the circulation assembly 204 is in the closed position), the biasing device 264 exerts a biasing force in the uphole direction as indicated by arrow "J" in FIG. 11 to maintain the activation piston 260 in the uphole position.

The biasing device 264 in this embodiment comprises a spring 265 disposed around a tubular shaft 270. In other embodiments, the biasing device 264 may comprise any other suitable type of biasing device capable of exerting a biasing force on the activation piston 260.

The uphole end of the spring 265 engages the tubular shaft 270 via a slidable coupling element 269 and the downhole end of the spring 265 engages a spring stop 272. The spring stop 272 is fixedly attached to the circulation sub 252 such that the spring stop 272 is not movable with respect to the circulation sub 252. The uphole end of the tubular shaft 270 engages the activation piston 260 and the downhole end engages a mandrel 274, described in more detail below. The tubular shaft 270 is axially movable within the circulation sub 252 such that the tubular shaft 270 slides uphole and downhole when the activation piston 260 moves between the uphole position and downhole position, respectively. An axial bore 273 extends through the tubular shaft 270 and forms part of the axial passage 208.

Figure 12:
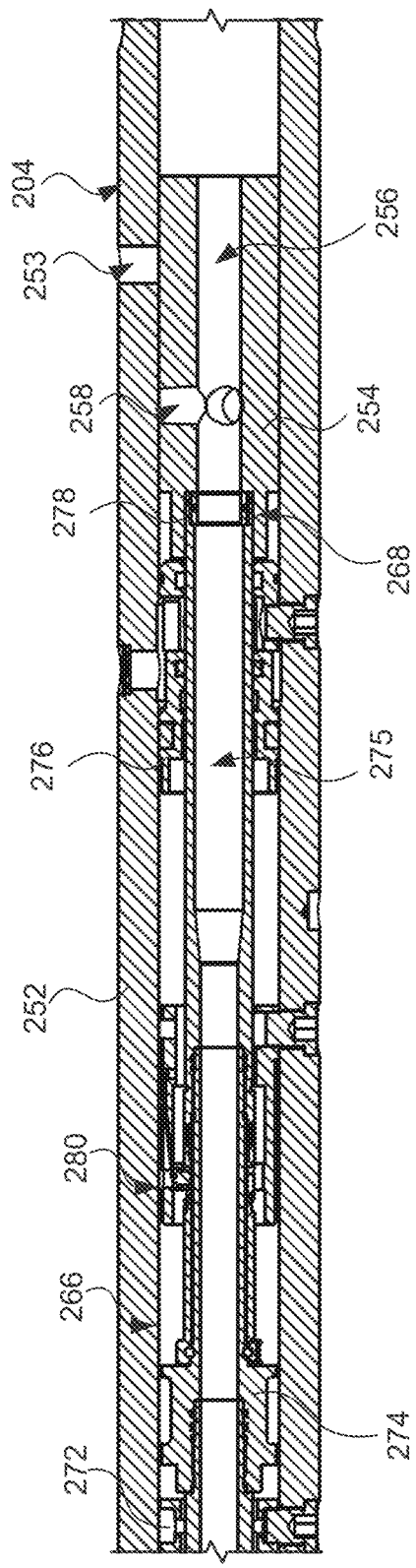

Referring to FIG. 12, in this embodiment, the actuation mechanism 206 further comprises a mandrel 274 that is received within the circulation sub 252 and interconnects the tubular shaft 270 of the biasing device 264 with the circulation piston 254. The mandrel 274 comprises a mandrel bore 275 extending axially therethrough that forms part of the axial passage 208. The uphole end of the mandrel 274 is coupled to the tubular shaft 270 and the downhole end is coupled to the circulation piston 254. The mandrel 274 is axially movable within the circulation sub 252 such that the mandrel 274 slides uphole and downhole when the activation piston 260 moves between the uphole position and downhole position, respectively.

In this embodiment, the downhole end of the mandrel 274 is received into the uphole end of the circulation piston 254. A balance piston 276 is positioned around the mandrel 274 adjacent to the circulation piston 254. The balance piston 276 separates oil from mud within the circulation sub 252 and balances pressure between the interior of the circulation sub 252 and the annulus of the borehole.

In some embodiments, the pressure differential mechanism 268 comprises a flow restrictor. In this embodiment, the flow restrictor comprises a bit jet 278. In other embodiments, the pressure differential mechanism 268 comprises any other suitable mechanism for generating a pressure differential.

The bit jet 278 is positioned in the mandrel bore 275 at the downhole end of the mandrel 274 and restricts the flow of fluid flowing through the axial passage 208. As drilling fluid passes through the bit jet 278, the bit jet 278 creates a pressure differential (i.e., a pressure drop) across the interior of the circulation sub 252. As the flow rate of the drilling fluid increases, the pressure differential also increases. When the flow rate reaches an activation threshold, the pressure differential will "activate" the activation piston 260 by allowing the activation piston 260 to overcome the biasing force of the biasing device 264 and compress the spring 265. The activation piston 260 will thereby slide axially from the uphole position to the downhole position. The activation threshold flow rate is primarily determined by the strength of the biasing force of the biasing device 264 and the magnitude of the pressure drop caused by the bit jet 278, although other components of the system 200 may also affect the pressure differential.

As discussed above, the activation piston 260 is coupled at its uphole end to the balance piston sleeve 249 via the split connector 262. The balance piston sleeve 249 in turn is coupled at its uphole end to the shuttle 212. Therefore, when the activation piston 260 shifts from the uphole position to the downhole position, the shuttle 212 shifts from the uphole position to the downhole position, thereby moving the clutch assembly 202 from the engaged position to the disengaged position.

The activation piston 260 is coupled at its downhole end to the tubular shaft 270, which is coupled to the circulation piston 254 via the mandrel 274. Therefore, when the activation piston 260 shifts from the uphole position to the downhole position, the circulation piston 254 shifts from its uphole position to its downhole position, thereby moving the circulation assembly 204 from the closed position to the open position.

When the fluid flow rate drops below the activation threshold, the pressure differential decreases, and the biasing force of the biasing device 264 pushes the activation piston 260 back into the uphole position. The biasing device 264 therefore functions as a return mechanism in this embodiment to return the activation piston 260 to its original position. In other embodiments, a separate return mechanism may be provided for resetting the activation piston 260. When the activation piston 260 is returned to the uphole position, the shuttle 212 and the circulation piston 254 also return to their respective uphole positions such that the clutch assembly 202 is in the engaged position and the circulation assembly 204 is in the closed position.

In this embodiment, the shuttle 212, the balance piston sleeve 249, the activation piston 260, tubular shaft 270, the mandrel 274, and the circulation piston 254 are all connected and therefore slide uphole and downhole as a single unit. However, alternative embodiments are also contemplated into which the shuttle 212, the circulation piston 254, and/or one or more sub-assemblies are actuated to slide uphole and downhole independently.

In some embodiments, the actuation mechanism 206 further comprises an indexing mechanism 266. The indexing mechanism 266 may be configured to releasably lock the shuttle 212, the circulation piston 254, and the activation piston 260 in their respective uphole positions or downhole positions. The indexing mechanism 266 in this embodiment comprises a barrel cam assembly 280. Non-limiting examples of alternative indexing mechanisms include a linear actuator, a collet mechanism, and a j-slot mechanism.

Figure 13A:
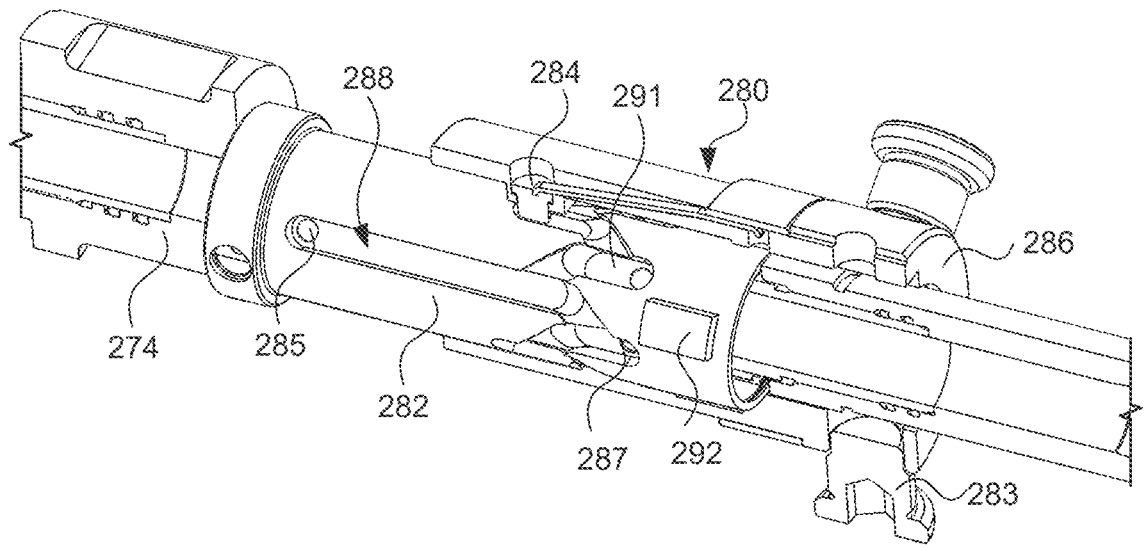
FIG. 13A is a perspective, partial cross-sectional view of a barrel cam assembly of the actuation mechanism of FIGS. 11 and 12.

Referring to FIG. 13A, the barrel cam assembly 280 comprises a barrel cam 282 and a barrel cam pin 284. The barrel cam pin 284 in this embodiment is fixedly mounted to a tubular collar 286. The tubular collar 286 is fixedly mounted to the circulation sub 252 (not visible in FIG. 13A) via bolts 283. The barrel cam pin 284 projects radially inwards towards the barrel cam 282.

Figure 13B:
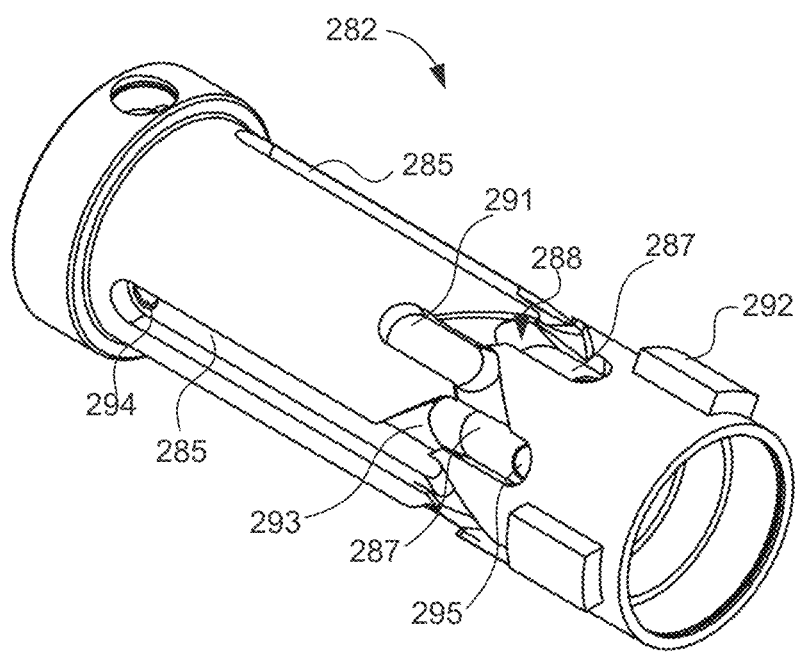
FIG. 13B is a perspective view of a barrel cam of the barrel cam assembly of FIG. 13A.

The barrel cam 282 is mounted on the mandrel 274 and is axially movable by the mandrel 274 with respect to the tubular collar 286. The barrel cam 282 is rotatable with respect to both the mandrel 274 and the tubular collar 286. Referring to FIG. 13B, the barrel cam 282 defines a circumferential track 288 on an external surface thereof that is dimensioned to receive the barrel cam pin 284. The track 288 may define two or more longitudinal grooves for the barrel cam pin 284. In this embodiment, the track 288 defines a plurality of uphole longitudinal grooves 285 and a plurality of downhole longitudinal grooves 287. In some embodiments, the track 288 also defines a plurality of intermediate longitudinal grooves 291. The track 288 further defines a plurality of diagonal grooves 293 that interconnect the longitudinal grooves 285, 287, and 291 and force the barrel cam pin 284 to travel along the track 288 in a single direction. The barrel cam 282 may further comprise one or more stops 292 downhole of the track 288 to prevent overtravel of the barrel cam pin 284.

During normal drilling operation, the barrel cam pin 284 will be positioned in one of the downhole longitudinal grooves 287 or one of the intermediate grooves 291 as a result of the biasing force provided by the biasing device 264 on the activation piston 260, which holds the activation piston 260, the shuttle 212, and the circulation piston 254 in their respective uphole positions. Variations in fluid flow may cause the barrel cam 282 to rotate, causing the barrel cam pin 284 to move along the track 288 from a downhole groove 287 to an adjacent intermediate groove 291 or vice versa.

When the fluid flow rate (and thus the pressure differential) reaches the activation threshold, the barrel cam 282 will rotate as the activation piston 260 overcomes the biasing force and shifts into its downhole position, causing the barrel cam pin 284 to travel along the circumferential track 288 into an adjacent uphole longitudinal groove 287. Movement of the activation piston 260 in the downhole direction will push the mandrel 274 (with the barrel cam 282 mounted thereon) downhole, causing the barrel cam pin 284 to travel upwards along the uphole groove 285 until it reaches the uphole end 294 of the uphole groove 285, thereby locking the activation piston 260, the shuttle 212, and the circulation piston 254 in their respective downhole positions. The distance between the uphole end 294 of the uphole groove and the downhole end 295 of the downhole groove 287 therefore determines the maximum stroke length of the activation piston 260.

When the fluid flow rate decreases below the activation threshold, the barrel cam 282 will rotate and the barrel cam pin 284 will travel along the track 288 into the next adjacent downhole groove 287 and the activation piston 260, the shuttle 212, and the circulation piston 254 will return to their respective uphole positions and the cycle can start again.

Figure 15:
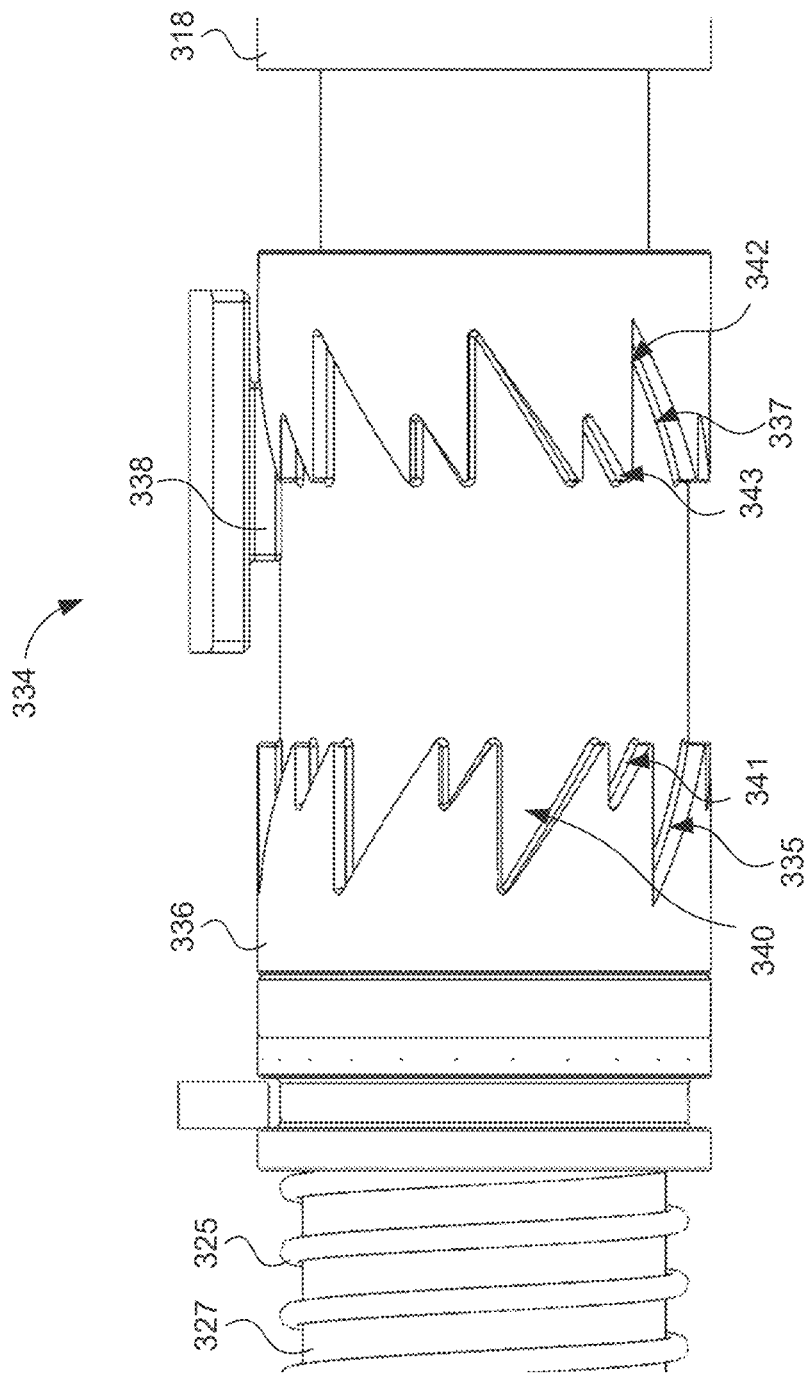
FIG. 15 is an enlarged, side view of a barrel cam assembly of the system of FIGS. 14A-14B.

An alternative embodiment of a clutch and circulation system 300 will be discussed with reference to FIGS. 14A to 15. The system 300 is configured to be incorporated into a drill string with a BHA including a drill bit and an RSS. In use, the drill string, including the system 300, would be positioned in a borehole (not shown) with an annulus therebetween.

Referring to FIGS. 14A and 14B, the system 300 in this embodiment comprises a clutch assembly 302, a circulation assembly 304, and an actuation mechanism 306 (the full mechanism 306 is visible in FIG. 14B). An axial passage 308 extends through the system 300 to allow drilling fluid to flow therethrough.

The clutch assembly 302 has an engaged position (shown in FIG. 14A) and a disengaged position (shown in FIG. 14B). The clutch assembly 302 comprises a driveshaft 310 and a shuttle 312. The uphole end of the driveshaft 310 (not shown) is coupled to an uphole portion of the drill string. The driveshaft 310 comprises an axial bore 314 extending therethrough that forms part of the axial passage 308. The driveshaft 310 comprises a male spline 311 and the shuttle 312 comprises a female spline 313 that engages the male spline 311.

The shuttle 312 is axially movable with respect to the driveshaft 310. The shuttle 312 has an uphole (engaged) position (FIG. 14A) in which the female spline 313 of the shuttle 312 interlocks with the male spline 311 of the driveshaft 310. When the shuttle 312 is in the uphole/ engaged position, the clutch assembly 302 is in the engaged position and the driveshaft 310 drives rotation of the shuttle 312. The shuttle 312 also has a downhole (disengaged) position (FIG. 14B) in which the female spline 313 of the shuttle 312 is displaced from the male spline 311 of the driveshaft 310. When the shuttle 312 is in the downhole/ disengaged position, the clutch assembly 302 is in the disengaged position and the driveshaft 310 rotates independently of the shuttle 312.

The circulation assembly 304 has a closed position (shown in FIG. 14A) and an open position (shown in FIG. 14B). The circulation assembly 304 comprises a circulation housing (also referred to as a circulation sub) 316 and a circulation piston 318.

The circulation sub 316 has an uphole end 315 and a downhole end 317. In this embodiment, the circulation sub 316 is configured to at least partially receive the shuttle 312 of the clutch assembly 302 proximate the uphole end 315. The circulation sub 316 may comprise a splined portion (not shown) on an inner surface thereof that engages the female spline 313 of the shuttle 312 such that the circulation sub 316 rotates with the shuttle 312 when the clutch assembly 302 is in the engaged position. The downhole end 317 of the circulation sub 316 is coupled to a downhole portion of the drill string (not shown). The circulation sub 316 receives the circulation piston 318 therein proximate the downhole end 317. The circulation sub 316 further comprises one or more first apertures 320 (also referred to as radial ports 320) extending radially therethrough proximate the downhole end 317. The port(s) 320 are in fluid communication with the annulus of the borehole.

The circulation piston 318 comprises an axial bore 322 extending therethrough that forms part of the axial passage 308. The circulation piston further comprises one or more second apertures 324 (also referred to as bypass holes 324) extending radially therethrough. The circulation piston 318 is axially movable with respect to the circulation sub 316. The circulation piston 318 has an uphole (closed) position (FIG. 14A) in which the bypass holes 324 are axially offset from the radial ports 320 of the circulation sub 316. When the circulation piston 318 is in the uphole/closed position, the circulation assembly 304 is in the closed position and the axial passage 308 is not in fluid communication with the annulus of the borehole. The circulation piston 318 also has a downhole (open) position (FIG. 14B) in which the bypass holes 324 are aligned with radial ports 320 of the circulation sub 316. When the circulation piston 318 is in the downhole/ open position, the circulation assembly 304 is in the open position and the axial passage 308 is in fluid communication with the annulus.

In this embodiment, the actuation mechanism 306 comprises a biasing device 326, a valve seat 328, an indexing mechanism 330, and a destructible ball 332 (the ball 332 is visible in FIG. 14B).

The biasing device 326 may comprise a spring 325 disposed around a mandrel 327. The mandrel 327 is coupled to the shuttle 312 via a connector 333 at its uphole end and coupled to the circulation piston 318 at its downhole end. The mandrel 274 is axially slidable with respect to the circulation sub 316 such that the shuttle 312, the mandrel 327, and the circulation piston 318 move axially uphole and downhole as a single unit. The mandrel 327 comprises an axial bore 331 extending therethrough that forms part of the axial passage 308. During normal drilling operation, the spring 325 exerts a biasing force against the mandrel 327 in the uphole direction as indicated by arrow "K" in FIG. 14A that maintains the shuttle 312 and the circulation piston 318 in their respective uphole positions.

The indexing mechanism 330 in this embodiment comprises a barrel cam assembly 334. The barrel cam assembly 334 comprises a barrel cam 336 and a barrel cam pin 338. The barrel cam 336 is rotatably mounted to the mandrel 327 and the barrel cam pin 338 is non-rotatably mounted to the circulation sub 316. The barrel cam 336 is also axially slidable along with the mandrel 327. Referring to FIG. 15, the barrel cam 336 comprises a plurality of uphole grooves 335 and a plurality of downhole grooves 337 configured to receive the barrel cam pin 338. The plurality of uphole grooves 335 include alternating long grooves 340 and short grooves 341 and the plurality of downhole grooves 337 include alternating long grooves 342 and short grooves 343. In other embodiments, the indexing mechanism 330 may comprise a barrel cam assembly similar in structure to the barrel cam assembly 280 of the system 200 as described above.

Referring again to FIG. 14B, the valve seat 328 in this embodiment is disposed at the downhole end of the circulation piston 318. The valve seat 328 is configured to receive the ball 332 thereon. The valve seat 328 is annular in shape with a central opening 329 therethrough. In the absence of the ball 332, drilling fluid will flow through the central opening 329 towards the downhole portion of the drill string.

The ball 332 is made of a destructible material including, but not limited to, nylon. The ball 332 is releasable into the system 300 via the uphole portion of the drill string and travels through the axial passage 308 to the valve seat 328. The ball 332 has a greater diameter than the central opening 329 of the valve seat 328 such that the ball 332 seats on the valve seat 328 to block the flow of fluid through the central opening 329.

During normal drilling operation, the ball 332 is absent and the biasing force of the biasing device 326 maintains the shuttle 312 and the circulation piston 318 in their respective uphole positions such that the clutch assembly 302 is in the engaged position and the circulation assembly 304 is in the closed position (FIG. 14A). The barrel cam pin 338 is received in one of the downhole grooves 337 to lock the shuttle 312 and the circulation piston 318 in their uphole positions. Rotation of the uphole portion of the drill string will rotate the driveshaft 310, which drives rotation of the shuttle 312 and the circulation sub 316, which in turn drives rotation of the downhole portion of the drill string including the drill bit. Drilling fluid may flow downhole through the axial passage 308, through the central opening 329 of the valve seat 328, all the way to the drill bit.

When it is desired by the operator to cease rotation and fluid flow to the downhole portion of the drill string (e.g., during trip out or back reaming operations), the ball 332 may be sent downhole. The ball 332 will catch in the valve seat 328 and stop fluid from flowing through the central opening 329 of the valve seat 328. The backflow of fluid in the axial passage 308 will cause the spring 325 of the biasing device 326 to compress, allowing the mandrel 327 to overcome the biasing force and slide axially in the downhole direction. As the mandrel 327 slides downhole, the shuttle 312 and the circulation piston 318 will also slide axially into their respective downhole positions such that the clutch assembly 302 is in the disengaged position and the circulation assembly 304 is in the open position (FIG. 14B). The barrel cam 336 will slide downhole with the mandrel 327 and rotate until the barrel cam pin 338 locks into one of the uphole grooves 335. The barrel cam assembly 334 thereby locks the shuttle 312 and the circulation piston 318 in their downhole positions. With the clutch assembly 302 in the disengaged position, the shuttle 312, the circulation sub 316, and the downhole portion of the drill string (including the drill bit) no longer rotate with the uphole portion of the drill string. With the circulation assembly 304 in the open position, the drilling fluid will be diverted through the aligned bypass holes 324 and radial ports 320 into the annulus of the borehole. In this embodiment, since the ball 332 blocks the central opening 329 of the valve seat 328, the drilling fluid is completely diverted to the annulus such that effectively zero fluid continues downhole to the drill bit.

When it is desired to return to normal drilling operations, a dart or a ball cutter (not shown) will be sent downhole to break the ball 332. The fluid in the axial passage 308 will push the pieces of the ball 332 downhole to clear the central opening 329 of the valve seat 328. The operator will then cease the flow of drilling fluid through the drill string, which will cause the barrel cam 336 to cycle such that the barrel cam pin 338 locks into one of the uphole grooves 335. The spring 325 of the biasing device 326 will re-expand and the biasing force will push the mandrel 327 uphole, thereby returning the shuttle 312 and the circulation piston 318 to their respective uphole positions. The operator will then re-initiate flow of the drilling fluid and normal drilling operations can proceed.

In alternative embodiments of the clutch and circulation system, the actuation mechanism may not be a fully hydromechanical mechanism. In some embodiments, the actuation mechanism comprises an electric motor gearing system assembly and a power source that supplies power thereto (not shown). The power source may comprise one or more batteries, an onboard power generation system, or any other suitable source of power. The motor gearing system can be either paired or separate for the clutch assembly and the circulation assembly.

In some embodiments, the motor gearing system comprises a first motor assembly comprising a first electric motor operatively connected to a first gear assembly and a second motor assembly comprising a second electric motor operatively connected to a second gear assembly. The first motor assembly is operatively connected to the clutch assembly to actuate the shuttle between its uphole/engaged and downhole/disengaged positions. The second motor assembly is operatively connected to the circulation assembly to actuate the circulation piston between its uphole/ closed and downhole/open positions. Alternatively, the second motor assembly could be substituted with a valve and solenoid assembly.

In some embodiments, the first and second motor assemblies are selectively operatable such that both assemblies can be activated together or each assembly can be activated independently. For example, it may be desirable in some circumstances to turn the first motor assembly "on" and the second motor assembly "off", or vice versa. The first and second motor assemblies may be activated by means of an electronic signal, RFID tags, or any other suitable means.

Other variations are also possible. It will also be understood that the systems disclosed herein may comprise alternative sealing assemblies, bearing assemblies, balance piston assemblies, and any other suitable components, and embodiments are not limited to the specific configurations described herein.

Figure 16A:
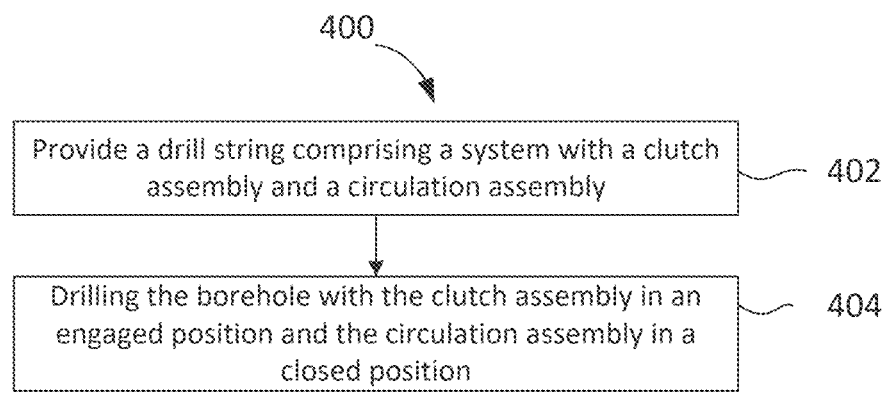
FIG. 16A is a flowchart of an example method for drilling a borehole, according to some embodiments.

FIG. 16A is a flowchart of an example method for drilling a borehole in an earth formation, according to some embodiments.

At block 402, a drill string is provided comprising an embodiment of the clutch and circulation system described herein including, for example, the system 200 or 300. The system may be installed between an uphole portion of the drill string and a downhole portion of the drill string, the downhole portion comprising a drill bit and, optionally, an RSS. In some embodiments, a mud motor is positioned in the uphole portion or the downhole portion. The system may comprise a clutch assembly, a circulation assembly, and an actuation mechanism.

At block 404, a borehole is drilled by the drill string with the clutch assembly in an engaged position and the circulation assembly in the closed position. The downhole portion of the drill string (including the drill bit) thereby rotates with the uphole portion and drilling fluid flows through the drill string to the drill bit.

Figure 16B:
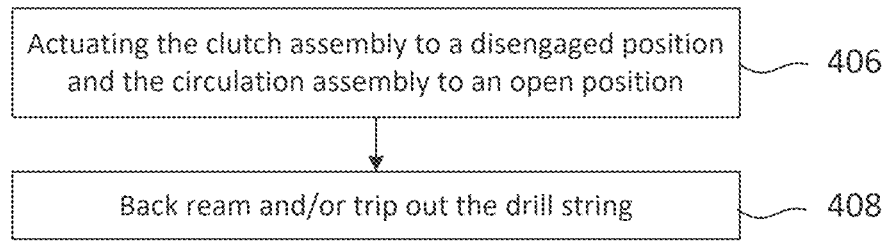
FIG. 16B is a flowchart with additional steps to the method of FIG. 16A.

FIG. 16B is a flowchart showing additional steps to the method 400 of FIG. 16A. At block 406, when desired or needed, the clutch assembly and the circulation assembly are actuated to a disengaged position and an open position, respectively, via the actuation mechanism. With the clutch assembly in the disengaged position and the circulation assembly in the open position, the rotation of the downhole portion of the drill string is reduced or completely ceases and the drilling fluid is at least partially diverted to the annulus of the borehole.

At block 408, the method 400 further comprises tripping out the drill string and/or back reaming the borehole with the clutch assembly in the disengaged position and the circulation assembly in the open position. The clutch assembly and the circulation assembly may then be returned to the engaged position and closed position, respectively, to resume normal drilling operations. It will be understood that the steps of block 406 and 408 are optional and may not be needed in all drilling operations.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system for a drill string, comprising:
a clutch assembly comprising a driveshaft and a shuttle, wherein the driveshaft comprises a first coupling element, the shuttle comprises a second coupling element and is axially movable between an engaged position in which the first coupling element engages the second coupling element, and a disengaged position in which the first coupling element is disengaged from the second coupling element;
a circulation assembly comprising a tubular housing having at least one first aperture extending radially therethrough and a circulation piston received within the housing, the circulation piston having at least one second aperture extending radially therethrough, wherein the circulation piston is axially movable within the housing between a closed position in which the at least one first and second apertures are axially offset and an open position in which the at least one first and second apertures are axially aligned; and
an actuation mechanism operatively connected to the clutch assembly and the circulation assembly, the actuation mechanism selectively actuatable to move the shuttle between the engaged position and the disengaged position and the circulation piston between the closed position and the open position, wherein the actuation mechanism comprises:
a mandrel coupled between the shuttle and the circulation piston and axially movable therewith;
a biasing device that exerts a biasing force on the mandrel to maintain the shuttle in the engaged position and the circulation piston in the closed position;
a valve seat to receive a ball thereon; and
wherein, when the ball is seated on the valve seat, the mandrel overcomes the biasing force to axially move the shuttle to the disengaged position and the circulation piston to the open position.

2. The system of claim 1, wherein the shuttle is in the engaged position when the circulation piston is in the closed position and the shuttle is in the disengaged position when the circulation piston is in the open position.

3. The system of claim 1, wherein:
the driveshaft comprises an axial bore extending therethrough and an external surface;
the shuttle has an uphole end, a downhole end, and comprises an internal surface defining a channel extending through the shuttle from the uphole end to the downhole end, the channel partially receiving the driveshaft therein;
wherein the shuttle is axially movable between the engaged position and the disengaged position.

4. The system of claim 1, wherein the first coupling element comprises a male spline with a plurality of outer teeth and the second coupling element comprises a female spline with a plurality of inner teeth, the outer teeth interlocking with the inner teeth when the shuttle engages the driveshaft.

5. The system of claim 1, wherein valve seat is positioned downhole of the biasing device.

6. The system of claim 1, wherein the biasing device comprises a spring.

7. The system of claim 1, wherein the actuation mechanism further comprises an indexing mechanism to maintain the clutch and circulation assemblies in a selected position.

8. The system of claim 7, wherein the indexing mechanism comprises a barrel cam assembly.

9. A drill string comprising:
an uphole portion rotatable from surface and a downhole portion comprising a rotary steerable system and a drill bit;
a mud motor operable to drive rotation of the drill bit; and
a clutch and circulation system, the system comprising:
a clutch assembly comprising: a driveshaft coupled to one of the uphole portion or the downhole portion of the drill string, and a shuttle coupled to the other of the uphole portion or the downhole portion of the drill string, wherein the driveshaft comprises a first coupling element, the shuttle comprises a second coupling element and is axially movable between an engaged position in which the first coupling element engages the second coupling element such that the downhole portion rotates with the uphole portion, and a disengaged position in which the first coupling element is disengaged from the second coupling element such that the uphole portion rotates independently of the downhole portion;
a circulation assembly comprising a tubular housing having at least one first aperture extending radially therethrough and a circulation piston received within the housing, the circulation piston having at least one second aperture extending radially therethrough, wherein the circulation piston is axially movable within the housing between a closed position in which the at least one first and second apertures are axially offset and an open position in which the at least one first and second apertures are axially aligned; and
an actuation mechanism operatively connected to the clutch assembly and the circulation assembly, the actuating mechanism selectively actuatable to move the shuttle between the engaged position and the disengaged position and the circulation piston between the closed position and the open position, wherein the actuation mechanism comprises:
a mandrel coupled between the shuttle and the circulation piston and axially movable therewith;
a biasing device that exerts a biasing force on the mandrel to maintain the shuttle in the engaged position and the circulation piston in the closed position;
a valve seat to receive a ball thereon; and
wherein, when the ball is seated on the valve seat, the mandrel overcomes the biasing force to axially move the shuttle to the disengaged position and the circulation piston to the open position.

10. The drill string of claim 9, wherein the system is positioned uphole of the mud motor such that the mud motor is in the downhole portion of the drill string.

11. The drill string of claim 9, wherein the driveshaft is coupled to the uphole portion of the drill string, and the shuttle is coupled to the downhole portion of the drill string.

12. A method for drilling a borehole comprising:
providing a drill string comprising a clutch and circulation system, the system comprising:
a clutch assembly coupling an uphole portion of the drill string to a downhole portion, the clutch assembly having an engaged position in which rotation of the uphole portion rotates the downhole portion, and a disengaged position in which the uphole portion rotates independently of the downhole portion;

a circulation assembly having an exhaust port, the circulation assembly having an open position in which the exhaust port is open and a closed position in which the exhaust port is closed; and an actuation mechanism operatively connected to the clutch assembly and the circulation assembly, the actuation mechanism selectively actuatable to move the clutch assembly between the engaged position and the disengaged position and the circulation assembly between the open position and the closed position;

drilling the borehole with the clutch assembly in the engaged position and the circulation assembly in the closed position; and at least one of back reaming through the borehole and tripping out the drill string, with the clutch assembly in the disengaged position and the circulation assembly in the open position.

13. The method of claim 12, further comprising actuating the clutch assembly to the disengaged position and the circulation assembly to the open position.

14. A system for a drill string, comprising:

a clutch assembly comprising a driveshaft and a shuttle, wherein the driveshaft comprises a first coupling element, the shuttle comprises a second coupling element and is axially movable between an engaged position in which the first coupling element engages the second coupling element, and a disengaged position in which the first coupling element is disengaged from the second coupling element;

a circulation assembly comprising a tubular housing having at least one first aperture extending radially therethrough and a circulation piston received within the housing, the circulation piston having at least one second aperture extending radially therethrough, wherein the circulation piston is axially movable within the housing between a closed position in which the at least one first and second apertures are axially offset and an open position in which the at least one first and second apertures are axially aligned; and a pressure-actuated actuation mechanism operatively connected to the clutch assembly and the circulation assembly, the actuation mechanism selectively actuatable to move the shuttle between the engaged position and the disengaged position and the circulation piston between the closed position and the open position, wherein the pressure-actuated actuation mechanism comprises:

a mandrel operatively connected between the shuttle and the circulation piston and operable to axially move the shuttle and the circulation piston;

a biasing device that exerts a biasing force on the mandrel to maintain the shuttle in the engaged position and the circulation piston in the closed position;

a pressure differential mechanism operable by fluid flow through the device to generate a pressure differential within a system downhole of the biasing device, the pressure differential generating a pressure differential force on the mandrel opposite to the biasing force; and wherein, when the pressure differential force overcomes the biasing force, the pressure differential force axially moves the shuttle to the disengaged position and the circulation piston to the open position.

15. The system of claim 14, wherein the pressure differential mechanism comprises a flow restrictor.

16. The system of claim 14, wherein:

the driveshaft comprises an axial bore extending therethrough and an external surface;

the shuttle has an uphole end, a downhole end, and comprises an internal surface defining a channel extending through the shuttle from the uphole end to the downhole end, and a second coupling element, the channel partially receiving the driveshaft therein;

wherein the shuttle is axially movable between the engaged position and the disengaged position.

17. The system of claim 14, wherein the biasing device comprises a spring.

18. The system of claim 14, wherein the actuation mechanism further comprises an indexing mechanism to maintain the clutch and circulation assemblies in a selected position.

19. The system of claim 18, wherein the indexing mechanism comprises a barrel cam assembly.

* * * * *